United States Patent
Lo et al.

(10) Patent No.: US 9,074,302 B2
(45) Date of Patent: Jul. 7, 2015

(54) METHODS OF MAKING DRAWN SILK FIBERS

(75) Inventors: Tim Jia-Ching Lo, Medford, MA (US);
Gary G. Leisk, Wilmington, MA (US);
David L. Kaplan, Concord, MA (US)

(73) Assignee: Trustees of Tufts College, Medford, MA (US)

( * ) Notice: Subject to any disclaimer, the term of this patent is extended or adjusted under 35 U.S.C. 154(b) by 626 days.

(21) Appl. No.: 13/498,722

(22) PCT Filed: Sep. 28, 2010

(86) PCT No.: PCT/US2010/050565
§ 371 (c)(1),
(2), (4) Date: Jun. 11, 2012

(87) PCT Pub. No.: WO2011/038401
PCT Pub. Date: Mar. 31, 2011

(65) Prior Publication Data
US 2012/0244143 A1  Sep. 27, 2012

Related U.S. Application Data

(60) Provisional application No. 61/246,323, filed on Sep. 28, 2009.

(51) Int. Cl.
| | | |
|---|---|---|
| *C08L 89/00* | (2006.01) | |
| *D01D 5/40* | (2006.01) | |
| *D01F 4/00* | (2006.01) | |
| *D01F 4/02* | (2006.01) | |
| *D01D 1/02* | (2006.01) | |
| *D01D 5/00* | (2006.01) | |
| *G02B 6/02* | (2006.01) | |

(52) U.S. Cl.
CPC .. *D01F 4/02* (2013.01); *D01D 1/02* (2013.01); *D01D 5/00* (2013.01); *G02B 6/02033* (2013.01)

(58) Field of Classification Search
CPC ............ C08L 89/00; D01D 5/00; D01D 5/40; D01F 4/00; D01F 4/02
USPC ............. 264/28, 164, 171.1, 202, 210.8, 211, 264/211.14
See application file for complete search history.

(56) References Cited

U.S. PATENT DOCUMENTS

| | | |
|---|---|---|
| 1,989,005 A | 1/1935 | Fink et al. |
| 4,233,212 A | 11/1980 | Otoi et al. |
| 4,798,722 A | 1/1989 | Edman et al. |
| 4,820,418 A | 4/1989 | Hirotsu et al. |
| 5,047,507 A | 9/1991 | Buchegger et al. |
| 5,252,285 A | 10/1993 | Lock |
| 5,290,494 A | 3/1994 | Coombes et al. |
| 5,538,735 A | 7/1996 | Ahn |
| 5,606,019 A | 2/1997 | Cappello |
| 5,728,810 A | 3/1998 | Lewis et al. |
| 5,770,193 A | 6/1998 | Vacanti et al. |
| 5,932,462 A | 8/1999 | Harris et al. |
| 5,994,099 A | 11/1999 | Lewis et al. |
| 6,106,816 A | 8/2000 | Hitchen |
| 6,110,590 A | 8/2000 | Zarkoob et al. |
| 6,123,819 A | 9/2000 | Peeters |
| 6,175,053 B1 | 1/2001 | Tsubouchi |
| 6,592,623 B1 | 7/2003 | Bowlin et al. |
| 6,815,427 B2 | 11/2004 | Tsubouchi et al. |
| 6,902,932 B2 | 6/2005 | Altman et al. |
| 7,041,797 B2 | 5/2006 | Vollrath |
| 7,057,023 B2 | 6/2006 | Islam et al. |
| 7,285,637 B2 | 10/2007 | Armato et al. |
| 7,635,755 B2 | 12/2009 | Kaplan et al. |
| 7,662,409 B2 | 2/2010 | Masters |
| 7,674,882 B2 | 3/2010 | Kaplan et al. |
| 7,727,575 B2 | 6/2010 | Kaplan et al. |
| 7,842,780 B2 | 11/2010 | Kaplan et al. |
| 7,960,509 B2 | 6/2011 | Kaplan et al. |
| 8,071,722 B2 | 12/2011 | Kaplan et al. |
| 8,129,141 B2 | 3/2012 | Kaplan et al. |
| 8,178,656 B2 | 5/2012 | Kaplan et al. |
| 8,187,616 B2 | 5/2012 | Wang et al. |
| 8,206,774 B2 | 6/2012 | Kaplan et al. |
| 8,288,347 B2 | 10/2012 | Collette et al. |
| 8,293,486 B2 | 10/2012 | Kaplan et al. |
| 8,354,501 B2 | 1/2013 | Kaplan et al. |
| 8,361,617 B2 | 1/2013 | Kaplan et al. |
| 8,420,077 B2 | 4/2013 | Altman et al. |
| 8,501,172 B2 | 8/2013 | Kaplan et al. |
| 8,501,437 B2 | 8/2013 | Kaplan et al. |
| 8,530,625 B2 | 9/2013 | Kaplan et al. |

(Continued)

FOREIGN PATENT DOCUMENTS

| | | |
|---|---|---|
| CA | 2405850 | 10/2002 |
| EP | 0361391 A2 | 4/1990 |

(Continued)

OTHER PUBLICATIONS

Agarwal et al., Journal of Applied Polymer Science, 63(3):401-410 (1997). "Effect of Moisture Absorption on the Thermal Properties of Bombyx mori Silk Fibroin Films."

(Continued)

*Primary Examiner* — Leo B Tentoni
(74) *Attorney, Agent, or Firm* — Choate, Hall & Stewart, LLP; Brian E. Reese

(57) ABSTRACT

The present invention relates to compositions and method for drawing egel silk fibroin fibers. The resulting fibers can transmit light and hence can be used as optical fiber. Silk fibroin fiber is produced by a method comprising applying an electric field to a solubilized silk fibroin solution to create a silk fibroin gel; converting the silk fibroin gel to a viscous silk liquid; and drawing a silk fiber from the viscous silk liquid. The silk fiber of the invention can be used in materials such as textile, medical sutures, and tissue materials, as well as conferring optical properties into these materials.

25 Claims, 19 Drawing Sheets

(56) References Cited

U.S. PATENT DOCUMENTS

| | | |
|---|---|---|
| 8,614,293 B2 | 12/2013 | Kaplan et al. |
| 2002/0028243 A1 | 3/2002 | Masters |
| 2003/0007991 A1 | 1/2003 | Masters |
| 2003/0183978 A1 | 10/2003 | Asakura |
| 2004/0005363 A1 | 1/2004 | Tsukada et al. |
| 2004/0097709 A1 | 5/2004 | Armato et al. |
| 2004/0266992 A1 | 12/2004 | Migliaresi et al. |
| 2005/0147681 A1 | 7/2005 | Zhao |
| 2005/0260706 A1 | 11/2005 | Kaplan et al. |
| 2007/0187862 A1 | 8/2007 | Kaplan et al. |
| 2007/0212730 A1 | 9/2007 | Vepari et al. |
| 2008/0058400 A1 | 3/2008 | Yang et al. |
| 2008/0085272 A1 | 4/2008 | Kaplan et al. |
| 2008/0280360 A1 | 11/2008 | Kaplan et al. |
| 2008/0293919 A1 | 11/2008 | Kaplan et al. |
| 2009/0171467 A1 | 7/2009 | Mann et al. |
| 2009/0202614 A1 | 8/2009 | Kaplan et al. |
| 2009/0232963 A1 | 9/2009 | Kaplan et al. |
| 2009/0234026 A1 | 9/2009 | Kaplan et al. |
| 2009/0297588 A1 | 12/2009 | Rheinnecker et al. |
| 2010/0028451 A1 | 2/2010 | Kaplan et al. |
| 2010/0046902 A1 | 2/2010 | Kaplan et al. |
| 2010/0055438 A1 | 3/2010 | Kaplan et al. |
| 2010/0063404 A1 | 3/2010 | Kaplan et al. |
| 2010/0065784 A1 | 3/2010 | Kaplan et al. |
| 2010/0068740 A1 | 3/2010 | Kaplan et al. |
| 2010/0070068 A1 | 3/2010 | Kaplan et al. |
| 2010/0095827 A1 | 4/2010 | Rheinnecker et al. |
| 2010/0096763 A1 | 4/2010 | Kaplan et al. |
| 2010/0120116 A1 | 5/2010 | Kaplan et al. |
| 2010/0178304 A1 | 7/2010 | Wang et al. |
| 2010/0191328 A1 | 7/2010 | Kaplan et al. |
| 2010/0196447 A1 | 8/2010 | Kaplan et al. |
| 2010/0203226 A1 | 8/2010 | Kaplan et al. |
| 2010/0249924 A1 | 9/2010 | Powell et al. |
| 2010/0292338 A1 | 11/2010 | Rheinnecker et al. |
| 2011/0008406 A1 | 1/2011 | Altman et al. |
| 2011/0008436 A1 | 1/2011 | Altman et al. |
| 2011/0008437 A1 | 1/2011 | Altman et al. |
| 2011/0014287 A1 | 1/2011 | Altman et al. |
| 2011/0020409 A1 | 1/2011 | Altman et al. |
| 2011/0046686 A1 | 2/2011 | Kaplan et al. |
| 2011/0052695 A1 | 3/2011 | Jiang et al. |
| 2011/0076384 A1 | 3/2011 | Cannizzaro et al. |
| 2011/0105402 A1 | 5/2011 | Kim et al. |
| 2011/0121485 A1 | 5/2011 | Rheinnecker et al. |
| 2011/0135697 A1 | 6/2011 | Omenetto et al. |
| 2011/0152214 A1 | 6/2011 | Boison et al. |
| 2011/0171239 A1 | 7/2011 | Kaplan et al. |
| 2011/0189292 A1 | 8/2011 | Lebreton et al. |
| 2011/0223153 A1 | 9/2011 | Lu et al. |
| 2012/0039986 A1 | 2/2012 | Reich et al. |
| 2012/0052124 A1 | 3/2012 | Kaplan et al. |
| 2012/0070427 A1 | 3/2012 | Kaplan et al. |
| 2012/0121820 A1 | 5/2012 | Kaplan et al. |
| 2012/0123519 A1 | 5/2012 | Lovett et al. |
| 2012/0171256 A1 | 7/2012 | Zhang et al. |
| 2012/0171265 A1 | 7/2012 | Altman et al. |
| 2012/0171770 A1 | 7/2012 | Numata et al. |
| 2012/0172317 A1 | 7/2012 | Altman et al. |
| 2012/0172985 A1 | 7/2012 | Altman et al. |
| 2012/0187591 A1 | 7/2012 | Wang et al. |
| 2012/0207837 A1 | 8/2012 | Powell et al. |
| 2012/0231499 A1 | 9/2012 | Lee et al. |
| 2012/0252120 A1 | 10/2012 | Kaplan et al. |
| 2012/0265297 A1 | 10/2012 | Altman et al. |
| 2013/0060008 A1 | 3/2013 | Wang et al. |
| 2013/0156844 A1 | 6/2013 | Kaplan et al. |
| 2013/0158131 A1 | 6/2013 | Kaplan et al. |
| 2013/0165004 A1 | 6/2013 | Kaplan et al. |
| 2013/0171260 A1 | 7/2013 | Kaplan et al. |
| 2013/0172995 A1 | 7/2013 | Altman et al. |
| 2013/0172999 A1 | 7/2013 | Kaplan et al. |
| 2013/0177608 A1 | 7/2013 | Kaplin et al. |
| 2013/0177611 A1 | 7/2013 | Kaplan et al. |
| 2013/0190222 A1 | 7/2013 | Kaplan et al. |
| 2013/0195831 A1 | 8/2013 | Kaplan et al. |
| 2013/0230491 A1 | 9/2013 | Vepari et al. |
| 2013/0243866 A1 | 9/2013 | Kaplan et al. |
| 2013/0287742 A1 | 10/2013 | Kaplan et al. |
| 2013/0287835 A1 | 10/2013 | Kaplan et al. |
| 2013/0338632 A1 | 12/2013 | Kaplan et al. |

FOREIGN PATENT DOCUMENTS

| | | |
|---|---|---|
| EP | 1277857 A1 | 1/2003 |
| EP | 1440088 | 5/2008 |
| GB | 1182153 | 2/1970 |
| JP | 55-139427 | 10/1980 |
| JP | 56166235 | 12/1981 |
| JP | 58-38449 | 8/1983 |
| JP | 60-142259 | 7/1985 |
| JP | 60-259677 | 12/1985 |
| JP | 01118544 | 11/1989 |
| JP | 04-263611 | 9/1992 |
| JP | H04 263611 | 9/1992 |
| JP | 05163132 | 6/1993 |
| JP | 06-346314 | 12/1994 |
| JP | 08-295697 | 11/1996 |
| JP | 10-36676 | 2/1998 |
| JP | 2000-273264 | 10/2000 |
| JP | 2003192807 | 7/2003 |
| JP | 2004068161 | 3/2004 |
| KR | 10-0730367 | 6/2007 |
| KR | 10-0730367 B1 | 6/2007 |
| WO | 99/01089 | 1/1999 |
| WO | 99/45964 A1 | 9/1999 |
| WO | 01/36531 | 5/2001 |
| WO | 01/56626 | 8/2001 |
| WO | 02/072931 | 9/2002 |
| WO | 03/022909 | 3/2003 |
| WO | 03/038033 | 5/2003 |
| WO | 2004/000915 | 12/2003 |
| WO | 2004/041845 | 5/2004 |
| WO | 2005/012606 | 2/2005 |
| WO | 2005/123114 | 12/2005 |
| WO | 2008/052755 A2 | 5/2008 |
| WO | 2008/052775 A2 | 5/2008 |
| WO | 2008/127405 | 10/2008 |
| WO | 2009/126689 | 10/2009 |
| WO | 2009/153140 A2 | 12/2009 |
| WO | 2009/156226 | 12/2009 |
| WO | 2010/060600 A1 | 6/2010 |
| WO | 2011/006133 | 1/2011 |

OTHER PUBLICATIONS

Altman et al., Biomaterials, 23:4131-4141 (2002). "Silk matrix for tissue engineered anterior cruciate ligaments.".

Altman et al., Biomaterials, 24:401-416 (2003). "Silk-based biomaterials.".

Ando et al, Reports on Progress in Polymer Physics in Japan, XXIII:775-778 (1980). "Piezoelectric and Related properties of Hydrated Silk Fibroin.".

Asakura et al., Macromolecules, 17:1075-1081 (1984). NMR of silk fibroin 2. 13C NMR study of the chain dynamics and solution structure of Bombyx mori silk fibroin.

Asakura et al., Macromolecules, 18:1841-1845 (1985). "Conformation Characterization of Bombyx Mori Silk Fibroin in the Solid State by High-Frequency 13C Cross Polarization-Magic Angle Spinning NMR, X-ray Diffraction, and Infrared Spectroscopy.".

Asakura et al., Biotechnology and Bioengineering, 35:511-517 (1990). An ESR Study of Spin-Labeled Silk Fibroin Membranes and Spin-Labeled Glucose Oxidase Immobilized in Silk Fibroin Membranes.

Bini et al., J. Mol. Biol., 335:27-40 (2004). "Mapping Domain Structures in Silks from Insects and Spiders Related to Protein Assembly.".

Cai et al., Int. J. Mol. Sci., 11:3529-3539 (2010). "Fabrication of Chitosan/Silk Fibroin Composite Nanofibers for Wound-dressing Applications.".

Chao et al., J Biomed Mater Res B Appl Biomater., 95(1):84-90 Author Manuscript (2010). "Silk hydrogel for cartilage tissue engineering.".

(56) References Cited

OTHER PUBLICATIONS

Chen et al., J Appl Polymer Sci, 65:2257-2262 (1997). "pH sensitivity and ion sensitivity of hydrogels based on complex-forming chitosan/silk fibroin interpenetrating polymer network.".
Chen et al., J Appl Polymer Sci, 73:975-980 (1999). "Separation of alcohol-water mixture by pervaporation through a novel natural polymer blend membrane-chitosan/silk fibroin blend membrane—chitosan / silk fibroin blend membrane."
Chen et al., Biomacromolecules, 3:644-648 (2002). "Rheological Characterization of Nephila Spidroin Solution."
Chen et al., J Biomed Mater Res, 67A:559-570 (2003). "Human bone marrow stromal cell and ligament fibroblast responses on RGD-modified silk fibers."
Chen et al., Proteins: Structure, Function, and Bioinformatics, 68:223-231 (2007). "Conformation transition kinetics of Bombyx mori silk protein."
Chen et al., Food Research International, 44:1468-1475 (2011). "Improvement of physicochemical stabilities of emulsions containing oil droplets coated by non-globular protein-beet pectin complex membranes."
Demura et al., Biosensors, 4:361-372 (1989). "Immobilization of biocatalysts with Bombyx mori silk fibroin by several kinds of physical treatment and its application to glucose sensors."
Demura et al., J Membrane Science, 59:39-52 (1991). "Porous membrane of Bombyx mori silk fibroin: structure characterization, physical properties and application to glucose oxidase immobilization."
Derwent Record, Abstract of JP 08295697 A2 "Production of aqueous solution of silk fibroin at high concentration." Nov. 12, 1996.
Doshi et al. J Electrostatics, 35:151-160 (1995). "Electrospinning process and applications of electrospun fibers."
Dyakonov et al., Journal of Drug Delivery, Article 490514 (2012). "Design and Characterization of a Silk-Fibroin-Based Drug Delivery Platform Using Naproxen as a Model Drug."
Freddi et al., J Appl Polymer Sci, 56:1537-1545 (1995). "Silk fibroin/cellulose blend films: preparation, structure, and physical properties."
Furst et al., Ann Thorac Surg, 79:1522-1529 (2005). "Release of Glutaraldehyde From an Albumin-Glutaraldehyde Tissue Adhesive Causes Significant In Vitro and In Vivo Toxicity."
Gill et al., Urology, 65:463-466 (2005). "Improved Hemostasis During Laparoscopic Partial Nephrectomy Using Gelatin Matrix Thrombin Sealant."
Hijirida et al., Biophysical Journal, 71:3442-3447 (1996). "13C NMR of *Nephila clavipes* major ampullate silk gland."
Hinman et al., TIBTECH, 18:374-379 (2000). "Synthetic spider silk: a modular fiber."
Hofmann et al., Journal of Controlled Release, 111:219-227 (2006). "Silk fibroin as an organic polymer for controlled drug delivery."
Horan et al., Biomaterials, 26:3385-3393 (2005). "In vitro degradation of silk fibroin."
Hu et al., Biomacromolecules, 12:1686-1696 (2011). "Regulation of Silk Material Structure by Temperature-Controlled Water Vapor Annealing."
Huang et al., J Biomater Sci Polymer Edn, 12(9):979-993 (2001). "Engineered collagen-PEO nanofibers and fabrics."
Huang et al., Macromolecules, 33:2989-2997 (2000). "Generation of synthetic elastin-mimetic small diameter fibers and fiber networks."
Jang et al., Oral Surg Oral Med Oral Pathol Oral Radiol Endod, 109:831-836 (2010). "Restoration of peri-implant defects in immediate implant installations by Choukroun platelet-rich fibrin and silk fibroin powder combination graft."
Jenkins et al., Surgery, 20:124-132 (1946). "Clinical and Experimental Observations on the Use of Gelatin Sponge or Foam."
Jiang et al., Materials Letters, 60:919-925 (2006). "Tensile behavior and morphology of differently degummed silkworm (*Bombyx mori*) cocoon silk fibres."
Jin et al., Biomacromolecules, 3:1233-1239 (2002). "Electrospinning *Bombyx mori* silk with poly(ethylene oxide)."
Jin et al., Adv. Funct. Mater., 15:1241-1247 (2005). "Water-Stable Silk Films with Reduced β-Sheet Content."
Jin et al., Nature, 424:1057-1061 (2003). "Mechanism of silk processing in insects and spiders."
Kim et al., Biomacromolecules, 5:786-792 (2004). "Structure and Properties of Silk Hydrogels."
Kweon et al., J Appl Polymer Sci, 80:1848-1853 (2001). "Preparation of semi-interpenetrating polymer networks composed of silk fibroin and poly(ethylene glycol) macromer."
Lawrence et al., Biomaterials, 30(7):1299-1308 Author Manuscript (2009). "Silk film biomaterials for cornea tissue engineering."
Lazaris, Science, 295:472-476 (2002). "Spider silk fibers spun from soluble recombinant silk produced in mammalian cells."
Lee et al., Oral Surg Oral Med Oral Pathol Oral Radiol Endod, 109:e33-e38 (2010). "A combination graft of low-molecular-weight silk fibroin with Choukroun platelet-rich fibrin for rabbit calvarial defect."
Leisk et al., Adv. Mater., 22:711-715 (2010). "Electrogelation for Protein Adhesives."
Li et al., Biomaterials, 27:3115-3124 (2006). "Electrospun Silk-BMP-2 scaffolds for bone tissue engineering."
Li et al., J Mater Sci: Mater Med, 19:577-582 (2008). "Effect of silicon on the formation of silk fibroin/calcium phosphate composite."
Liang et al., J Appl Polymer Sci, 45:1937-1943 (1992). "Improvements of the physical properties of fibroin membranes with sodium alginate."
Lin et al., Pharmaceutical Research, 26(3):631-643 (2008). "PEG Hydrogels for the Controlled Release of Biomolecules in Regenerative Medicine."
Lowe et al., J Cardiovasc Surg, 48(3):323-331 (2007). "Evaluation of the topical hemostatic efficacy and safety of TISSEEL VH S/D fibrin sealant compared with currently licensed TISSEEL VH in patients undergoing cardiac surgery: a phase 3, randomized double-blind clinical study."
Lu et al., Biomacromolecules, 10:1032-1042 (2009). "Stabilization of Enzymes in Silk Films."
Lu et al., Acta Biomater. 6(4):1380-1387 (2010). "Water-Insoluble Silk Films with Silk I Structure."
Marcovich et al., Urology, 57:806-810 (2001). "Comparison of 2-Octyl Cyanoacrylate Adhesive, Fibrin Glue, and Suturing for Wound Closure in the Porcine Urinary Tract."
Megeed et al., Pharmaceutical Research, 19(7):954-959 (2002). "Controlled release of plasmid DNA from a genetically engineered silk-elastinlike hydrogel."
Monti et al., Journal of Raman Spectroscopy, 29:297-304 (1998). "Raman Spectroscopic Studies of Silk Fibroin from *Bombyx mori*."
Nazarov et al., Biomacromolecules, 5:718-726 (2004). "Porous 3-D Scaffolds from Regenerated Silk Fibroin."
Pandit et al., Archives of Biochemistry and Biophysics, 149:259-268 (1972). "Studies on Silk Fibroin. I. Molecular Weight, Sedimentation Coefficient, Viscosity and Optical Rotation of Silk Fibroin from Carbonate-Extracted Silk Fiber."
Petrini et al., Journal of Materials Science: Materials in Medicine, 12:849-853 (2001). "Silk fibroin-polyurethane scaffolds for tissue engineering."
Preul et al., J Neurosurg, 107:642-650 (2007). "Application of a hydrogel sealant improves watertight closures of duraplasty onlay grafts in a canine craniotomy model."
Pritchard et al., Journal of Controlled Release, 144:159-167 (2010). "Silk fibroin encapsulated powder reservoirs for sustained release of adenosine."
Pritchard et al., Exper Opinion on Drug Delivery, 8(6):797-811 (2011). "Silk fibroin biomaterials for controlled release drug delivery."
Pritchard et al., Macromol. Biosci., 13:311-320 (2013). "Effect of Silk Protein Processing on Drug Delivery from Silk Films."
Rajkhowa et al., Journal of Applied Polymer Science, 119:1339-1347 (2011). "Molecular Weight and Secondary Structure Change in Eri Silk During Alkali Degumming and Powdering."
Reneker et al., Nanotechnology, 7:216-223 (1996). "Nanometre diameter fibres of polymer, produced by electrospinning."
Samal et al., Macromol. Mater. Eng., DOI: 10.1002/mame.201200377 (2013). "Ultrasound Sonication Effects on Silk Fibroin Protein."

(56) References Cited

OTHER PUBLICATIONS

Sawyer et al., JAMA, 191(9):740-742 (1965). "Dextran therapy in thrombophlebitis." Abstract.

Silva et al., Macromol. Biosci., 8:000-000 (2008). "Genipin-Modified Silk Fibroin Nanometric Nets."

Soffer et al., J Biomater Sci Polym Ed., 19(5):653-664 Author Manuscript (2008). "Silk-Based Electrospun Tubular Scaffolds for Tissue Engineered Vascular Grafts."

Sofia et al., Journal of Biomedical Materials Research, 54(1):139-148 (2001). "Functionalized silk-based biomaterials for bone formation."

Spotnitz et al., Transfusion, 48:1502-1516 (2008). "Hemostats, sealants, and adhesives: components of the surgical toolbox."

Torchiana, J Card Surg, 18:504-506 (2003). "Polyethylene Glycol Based Synthetic Sealants: Potential Uses in Cardiac Surgery."

Tsukada et al., J. of Applied Polymer Science, 54(4):507-514 (1994). "Preparation and Application of Porous Silk Fibroin Materials."

U.S. Appl. No. 60/906,509, filed Mar. 13, 2007 by Omenetto et al.

U.S. Appl. No. 61/224,618, filed Jul. 10, 2009 by Numata et al.

Vanderhooft et al., Biomacromolecules, 8:2883-2889 (2007). "Synthesis and Characterization of Novel Thiol-Reactive Poly(ethylene glycol) Cross-Linkers for Extracellular-Matrix-Mimetic Biomaterials."

Wallace et al., J Biomed Mater Res (Appl Biomater), 58:545-555 (2001). "A Tissue Sealant Based on Reactive Multifunctional Polyethylene Glycol."

Wang et al., Langmuir, 21:11335-11341 (2005). "Biomaterial coatings by stepwise deposition of silk fibroin."

Wang et al., J Control Release, 134(2):81-90 (2009). "Growth Factor Gradients via Microsphere Delivery in Biopolymer Scaffolds for Osteochondral Tissue Engineering."

Wenk et al., Diss. Eth No. 18659 (2009). "Silk Fibroin As a Vehicle for Drug Delivery in Tissue Regeneration."

Wheat et al., Urol Clin North Am., 36(2):265-275 (2009). "Advances in Bioadhesives, Tissue Sealants, and Hemostatic Agents."

Wilson et al., PNAS, 98(24):13660-13664 (2001). "Surface organization and nanopatterning of collagen by dip-pen nanolithography."

Wray et al., J Biomed Mater Res Part B, 99B:89-101 (2011). "Effect of Processing on silk based biomaterials: Reproducibility and biocompatibility."

Yamada et al., Materials Science and Engineering C, 14:41-46 (2001). "Preparation of undegraded native molecular fibroin solution from silkworm cocoons."

Yamada et al., Thin Solid Films, 440:208-216 (2003). "AFM observation of silk fibroin on mica substrates: morphologies reflecting the secondary structures."

Yucel et al., J. Struct Biol., 170(2):406-412 (2010). "Non-equilibrium Silk Fibroin Adhesives."

Zhou et al., Proteins: Structure, Function, and Genetics, 44:119-122 (2001). "Silk Fibroin: Structural Implications of a Remarkable Amino Acid Sequence."

Zhou et al., Chem Commun, 2518-2519 (2001). "Preparation of a novel core-shell nanostructured gold colloid-silk fibroin bioconjugate by the protein in situ redox technique at room temperature."

International Search Report for PCT/US2010/050565, 3 pages (Jun. 29, 2011).

Written Opinion for PCT/US2010/050565, 4 pages (Jun. 29, 2011).

Ha et al., Biomacromolecules, 6(3):1722-1731 (2005). "Structural studies of *Bombyx mori* silk fibroin during regeneration from solutions and wet fiber spinning."

Park et al., Polymer, 45(21):7151-7157 (2004). "Effect of chitosan on morphology and conformation of electrospun silk fibroin nanofibers."

FIG. 15
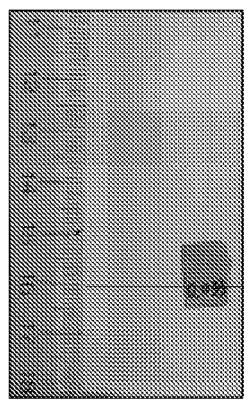 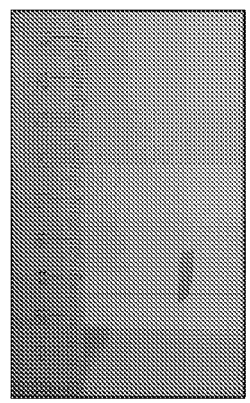 
FIG. 16A   FIG. 16B   FIG. 16C

METHODS OF MAKING DRAWN SILK FIBERS

CROSS REFERENCE TO RELATED APPLICATIONS

This application is a 35 U.S.C. §371 National Phase Entry Application of International Application No. PCT/US2010/50565 filed Sep. 28, 2010, which designates the U.S., and which claims benefit under 35 U.S.C. §119(e) of U.S. Provisional Application No. 61/246,323 filed Sep. 28, 2009, the content of which is incorporated herein by reference in its entirety.

GOVERNMENT SUPPORT

This invention was made with government support under EB002520 awarded by the National Institutes of Health, under FA9550-07-1-0079 awarded by the U.S. Air Force, and under W911SR-08-C-0012 awarded by the U.S. Army Research, Development and Engineering Command Acquisition Center. The U.S. government has certain rights in the invention.

FIELD OF THE INVENTION

This invention provides for compositions and methods for drawing egel silk fibroin fibers. The resulting fibers can transmit light and hence can be used as optical fiber. Moreover, the silk fiber of the invention can be used in materials such as textile, medical sutures, and tissue materials, as well as conferring optical properties into these materials.

BACKGROUND

Optical fibers are typically flexible glass rods as thin as hair, which act as "wires" transmitting light or other data. In simple terms, they work by totally reflecting the light inside so that none of it leaks out. Synthetic polymer optical fibers are typically formed by extruding a viscous liquid through a small orifice called a spinneret. The viscous liquid is turned into a continuous filament which can be further solidified using post-extrusion processing.

One of the most useful characteristics of optical fibers is their ability to enter the minute passageways and hard-to-reach areas of the human body. Fiber optics has made important contributions to the medical field, especially with regards to surgery. This has been accomplished by cutting and polishing the ends of a very slim bundle of fibers, to form a fiberscope. The light is sent to the site of inquiry, reflected off of the area that the doctor wishes to see, and sent back to a receiver. Afterwards, the image is magnified to be analyzed. Because optical fibers are so flexible, they are able to navigate around the curvy parts of the human body in areas such as the stomach, heart, blood vessels, and joints. It is now even becoming possible to do surgery with instruments attached to the optical fibers, such as joint surgeries. Fiber optics is becoming especially important in heart surgery, since it can be done without disturbing the functions of this delicate organ.

A desirable alternative to glass or synthetic fibers would be a natural polymer fiber that is biodegradable, biocompatible, made by relatively simple techniques from renewable sources and aqueous procedures, can transmit light, and can also be weaved as conventional fibers into textiles, medical sutures, implantable tissue materials and in the mean time conferring optical properties to these materials.

SUMMARY

Silk electrogelation (egel) is a processing modality for silk fibroin protein. In simple terms, the egel process applies an electric field to solubilized silk fibroin solution, causing a transformation of the silk solution's random coil conformation into a meta-stable, silk I conformation. The resulting gel-like substance has many interesting properties, including muco-adhesive qualities and the ability to be further transformed into other conformations, including back to a random coil conformation or to an even higher-order β-sheet conformation.

The silk fibers in accordance with the present invention may be manufactured without the need for high-temperature furnaces and the large expense of conventional systems. A silk fiber in accordance with the present invention uses a silk fibroin gel as a base material to create fibers with improved mechanical properties, such as, for example, shear strength.

Further, silk fibers in accordance with the present invention are biocompatible, biodegradable and implantable. The silk fiber produced with the method of the invention is transparent and can transmit light, and thus can be used as an optical fiber. Accordingly, the silk fibers may be used to monitor health conditions in vivo or may be implanted as a part of a sensing system to monitor and transmit information related to disease processes, treatment efficacy, and tissue growth. The silk fibroin gel in accordance with the present invention may be used as a coating for any number of optical fiber and transmission media devices.

Additionally, silk fibers of the invention can be incorporated in textile-based components or structures, such as mats, yarns, and braids, to provide the smart-structure or smart-material enhancement of carrying sensor or computational data through the structure, due to the light transmission properties of the silk fiber. One such application could be a soft robot body containing silk optical fiber, in which sensor data is transmitted through the body wall, without the need for traditional wiring. Silk optical fibers can be used as sensors, such as in the measurement of curvature in biomechanical applications (such as a spine) or in measuring structure and building deformation (such as bridges or buildings in normal or severe weather or under unusual loading, such as in an earthquake).

The methods of producing silk egel fibers include an electrogelation process such as: applying an electric field (e.g., 25 VDC) to platinum electrodes submerged in solubilized silk solution. After a suitable time of electric field application (e.g., 10 minutes), a gel-like material has formed on the positive electrode, which has an increased level of meta-stable silk I conformation. When this silk gel is placed into a heated water bath, the gel dissociates into a fairly viscous liquid that settles at the bottom of the water bath. This viscous fluid can then be drawn out of the water bath to form a long fiber with unique mechanical properties and adjustable cross-section. The drawn fibers may be tougher if the dissociated gel is quenched in sub-zero temperature water (water which contains salt and crushed ice) before drawing into room-temperature air environment. In addition, the behavior of the fibers in a humid environment is consistent with the elongation/contraction response that is reported in spider silks. Importantly, the drawn egel fiber transmits light.

Silk egel fiber drawing creates silk fibers with robust mechanical properties. Given the ability to artificially create fibers with customized properties and size provides for many applications. For example, all-silk composite materials can be constructed from silk fibroin solutions, eliminating the need for traditional spooled silk fibers.

Moreover, the drawn silk fibers exhibit supercontraction when fully hydrated. Furthermore, the fibers exhibit reversible stretching and contraction under humidity cycling. Accordingly, silk fibers may be useful as an analog to muscle fibers to make artificial muscles, actuators for small and/or biomimetic robots, or for other applications such as drug release.

Additionally, because the drawn fibers transmit light, there are many potential applications for a silk optical fiber. For example, the fiber can be used in vivo to monitor health conditions, implanted as part of a sensing system to monitor healing, or incorporated in tissue engineering constructs to relay information on tissue ingrowth and scaffold degradation. As in traditional optical fiber applications, silk fibers can be used for long-range or short-range communication, in illumination, or laser-based applications. Because silk is biodegradable, the optical fiber would eventually degrade and absorb into the body.

In one aspect, then, described herein is a method of creating a silk fiber comprising: applying an electric field to a solubilized silk fibroin solution to create a silk fibroin gel; quenching the silk fibroin gel in water to generate a viscous silk liquid; and drawing the silk fibroin gel from the viscous silk liquid to create a silk fiber. In one embodiment, the water has a temperature at or below 0° C. In another embodiment, the water has a temperature in the range from 40° C. to 80° C., inclusive.

In another embodiment, the drawing of the silk is performed at a temperature within the range of 10° C. to 40° C., inclusive.

In another embodiment, the method further comprises drying the silk fiber.

In another embodiment, the method further comprises contracting the silk fiber. In one embodiment, contracting the silk fiber includes reducing the ambient humidity to which the silk fiber is exposed.

In another embodiment, the method further comprises expanding the silk fiber. In one embodiment, expanding the silk fiber includes increasing the ambient humidity to which the silk fiber is exposed.

In another embodiment, the silk fiber is processed with a methanol treatment to generate a water-insoluble silk fiber.

In another embodiment, the method further comprises wrapping a plurality of silk optical fibers.

In another embodiment, the silk fiber is an optical fiber.

In another embodiment, the method further comprises forming a fiber optic cable with the silk optical fiber.

In another embodiment, the method further comprises receiving, by the silk optical fiber, incident light from a light source.

In another embodiment, the silk optical fiber is a waveguide.

In another embodiment, the silk optical fiber is a single mode fiber. In another embodiment, the silk optical fiber is a multi-mode fiber.

DESCRIPTION OF THE DRAWINGS

FIG. 15 shows an example humidity chamber showing the Kaz Ultrasonic Humidifier (right), Lufft humidity/temperature device (center), and drawn egel fiber hanging next to a metric scale (left).

FIG. 16A-16C depicts drawn silk egel fiber exposed to dry humidity: (16A) initial fiber length of about 15 cm with 33 mg weight attached at ambient humidity of 44.5%; (16B) at 94.6% humidity; and (16C) after evacuation to 47.8% humidity.

DETAILED DESCRIPTION

Figure 1A:
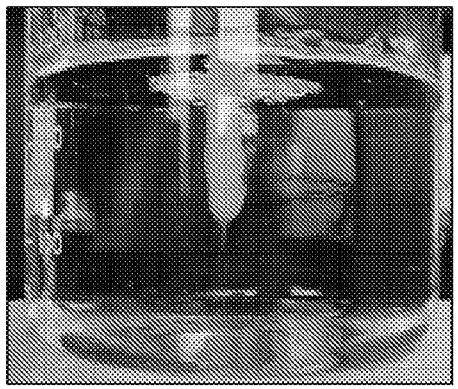
FIGS. 1A-1D show a series of photographs presenting a time lapse sequence showing effects of submerging electrogelated silk (egel) in 60° C.-75° C. water: (1A) 5 seconds; (1B) 15 second; (1C) 25 seconds; and (1D) 35seconds.
Figure 1B:
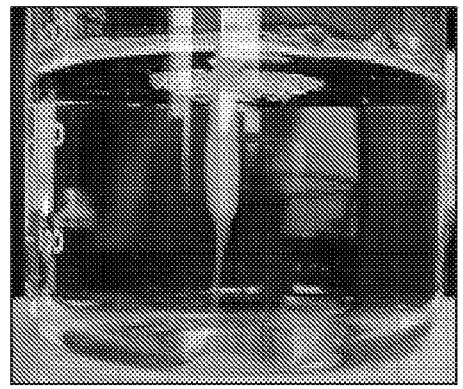
Figure 1C:
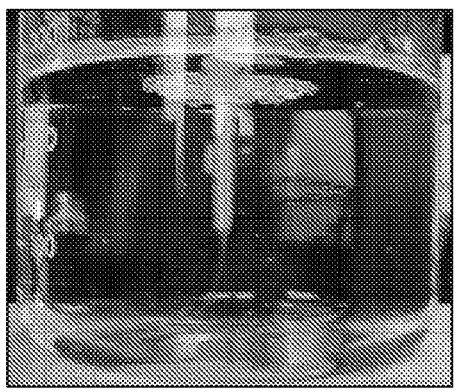
Figure 1D:
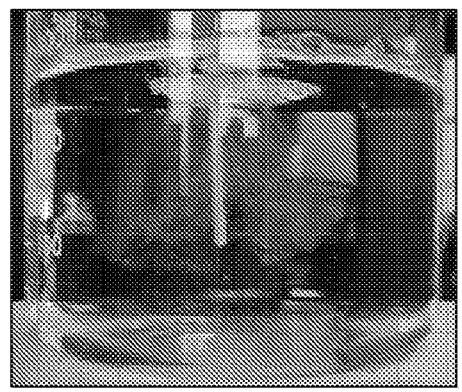

Synthetic polymer fibers are typically formed by extruding a viscous liquid through a small orifice called a spinneret. The viscous liquid is turned into a continuous filament which can be further solidified using post-extrusion processing. Four spinning methods are prevalent, including wet, dry, melt, and gel spinning. Wet spinning is used on materials that are dissolved in a solvent. The filaments are drawn through a spinneret that is submerged in a chemical bath that acts as a precipitating liquid. Dry spinning is also employed on materials in solution. In contrast, solidification occurs as the solvent is driven off by gas (e.g., air)-driven evaporation. Melt spinning involves the extrusion of melted material through a spinneret and solidification by cooling. Gel spinning, the most relevant process to the experiments described herein, is performed on a material that is not a true solution; polymer chains are bound together in liquid crystal form. By virtue of the inter-chain forces that develop and the alignment of the liquid crystals by shear forces during extrusion, resulting filaments can attain a high degree of alignment and greatly improved tensile strength.

Optical fibers are transmission media that carry an optical signal from a light source to, for example, an optical receiver of that signal. Optical fibers and fiber optic cables may be used to transmit signals such as voice, video, and data signals. The data signal from a communication signal source such as a telephone or data modem is modulated onto a light wave and transported via the optical fibers to the optical receiver. The data signal is then recovered at the receiver using a demodulation process.

Conventional optical fibers require protective coverings to protect silica-based optical fibers and to preserve their optical performance. The fiber optic cables must be protected from external forces such as tensile forces as well as from macro-bending and micro-bending to ensure satisfactory optical performance. Fiber optic cables and their optical fibers have inherent signal attenuation characteristics. Signals transmitted via an optical fiber are attenuated as they travel, and at some distance from the light source the signals reach a sufficiently low level as to require amplification.

Conventional glass optical fibers are typically made by either a crucible method, where powdered silica is melted, or by a vapor deposition process. Crucible methods may be used to produce large diameter multimode fibers suitable for short-distance transmission of many light wave signals. Vapor deposition processes are used to create a solid cylinder of core and cladding material that is then heated and drawn into a thinner optical fibers for longer distance communication.

The ability of silk fibroin films and other structures in optics has been explored, for example, in WO 2008/118211, Biopolymer Photonic Crystal & Method of Manufacturing the Same; WO 2008/127401, Biopolymer Optical Waveguide & Method of Manufacturing the Same; and WO 2008/140562, Electoreactive Biopolymer Optical & Electro-Optical Devices & Methods of Manufacturing the Same.

Silk electrogelation (egel) is a processing modality for silk fibroin protein. In simple terms, the egel process applies an electric field (either direct or alternating current, referred to as DC or AC) to solubilized silk fibroin solution, causing a transformation of the silk protein's random coil conformation into a meta-stable, silk I conformation. The electric field can be applied through using a voltage source, such as a DC or AC voltage source. Direct current is produced by sources such as batteries, thermocouples, solar cells, etc. Alternatively, alternating current (AC), the general powder source for business and residence, may also be used to induce the electrogelation process, although the gel formation may not be as fast as the gelation process induced by direct current voltage. Other methods of applying an electric field to the silk solution may also be used, such as current sources, antennas, lasers, and other generators. The resulting gel-like substance has a very sticky, thick, mucus-like consistency and has many interesting properties, including muco-adhesive qualities and the ability to be further transformed into other conformations, including back to a random coil conformation or to an even higher-order β-sheet conformation. The method of eletrogelation, the related parameters used in the eletrogelation process and the structural transition of silk fibroin during the electrogelation process may be found in WO/2010/036992, Active silk muco-adhesives, silk electrogelation process, and devices, which is incorporated herein as a reference in its entirety.

As used herein, the term "silk fibroin" includes silkworm fibroin and other insect or spider silk protein (Lucas et al., 13 Adv. Protein Chem. 107-242 (1958)). Silk fibroin can be obtained from a solution containing a dissolved silkworm silk or spider silk. The silkworm silk fibroins are obtained, for example, from the cocoon of *Bombyx mori*, and the spider silk fibroins are obtained, for example, from *Nephila clavipes*. In the alternative, the silk fibroins suitable for use in the present invention can be obtained from a solution containing a genetically engineered silk harvested from bacteria, yeast, mammalian cells, transgenic animals or transgenic plants. See, e.g., WO 97/08315 and U.S. Pat. No. 5,245, 012.

An aqueous silk fibroin solution may be prepared from the silkworm cocoons using techniques known in the art. Suitable processes for preparing silk fibroin solution are disclosed in, for example, U.S. patent application Ser. No. 11/247,358, WO/2005/012606, and WO/2008/127401. The concentration of silk fibroin aqueous solution may by decreased by dilution, or increased by dialyzing a lower concentration silk fibroin solution against a hygroscopic polymer, for example, PEG, a polyethylene oxide, amylose or sericin. See, e.g., WO 2005/012606. Optionally, the resulting silk solution may be further processed, e.g., through centrifugation or micro-filtration, to remove remaining particulates and to reach to a silk fibroin solution with minimal contaminants and reduced scattering for optical applications.

The embodiments described herein provide for a silk egel fiber drawing process. The several Examples describe experiments conducted to provide alternative fabrication strategies for silk egel fiber drawing. The results of these experiments show the potential for creating fibers with a range of cross-sections and potentially impressive mechanical properties. The process is aqueous-based and easily set up and executed on a lab bench. The fibers generated can be long, and the process can be both continuous and automated. It appears that a wide range of diameters can be produced. The solubility of the dried fiber can be changed by a post-processing treatment to generate water-insoluble conformations. For example, an alcohol treatment (e.g., methanol treatment) or water annealing treatment of the silk fibers, which can be included as part of a continuous processing approach, can provide water-insoluble silk fibers. The ability to drive the fiber diameters to very small cross sections could impart strength through the alignment of molecular chains along the fiber axis. Additionally, the use of an underwater spinneret may contribute to this strengthening effect. The use of the egel is key in generating fibers that rival the mechanical performance of native silkworm silk fiber. In addition, the silk conformation achieved with electrogelation may match the precursor gel-phase present in the glands of living silkworms and spiders before being extruded through spinnerets.

This process of fiber drawing may mimic the native process, leading to superior outcomes to all other fiber formation processes using regenerated silk. See, e.g., Zhou et al., Silk Fibers Extruded Artificially from Aqueous Solutions of Regenerated *Bombyx mori* Silk Fibroin are Tougher than their Natural Counterparts, 21 Adv. Mats. 366-70 (2009). Indeed, the drawn egel silk fibers can be very strong—the smallest-diameter fibers made by the techniques taught herein show higher strength than cocoon fiber.

The silk fiber made by the method of the present invention is quite transparent, can transmit light, such as a laser light, and therefore can be used as optical fiber.

The embodiments of the present invention thus provide for a method of forming an silk fiber comprising applying an electric field to a solubilized silk fibroin solution, transforming the solubilized silk fibroin solution to a silk gel based upon the applied electric field, converting the silk fibroin gel to a viscous silk liquid (e.g., quenching the silk gel water to generate a viscous silk liquid), and drawing the silk liquid to form a silk fiber. Optionally, the silk fibroin gel may be heated prior to the quenching step, and the silk fibroin gel may be heated to a temperature higher than the temperature of water used in the quenching step. For example, the silk fibroin gel may be heated to about 60° C., and quenched in a cool water bath (temperature of the water bath is lower than 60° C., such as ~0° C.). The drawing may be done in water having a temperature at or below 0° C.; in the range from 40° C. to 80° C.; or within the range of 10° C. to 40° C. The method may further include drying the silk fiber. The dried silk fiber is quite transparent and exhibits transmission of laser light.

The silk fiber may also be contracted, such as by reducing the ambient humidity to which the silk fiber is exposed; or expanded, such as by increasing the ambient humidity to which the silk fiber is exposed. Additionally, the silk fiber may be further processed, for example with a methanol treatment, to generate water-insoluble silk fiber.

In one embodiment, the silk fiber is used as optical fiber. The method may also further include forming a fiber optic cable with a silk optical fiber or a plurality of silk optical fibers.

Additionally, the silk optical fiber of the present invention may receive incident light from a light source; and may act as a waveguide, a multimode fiber, or a single mode fiber. A plurality of silk optical fibers may be wrapped into a fiber optic cable by techniques well-known in the art.

Silk fibers produced from the method of the invention may be wrapped with other type of fibers made from silk or other materials, natural or synthetic, into a fiber bundle or fiber composite. For example, a fiber composite may be made from one or more silk fibers of the invention combined with one or more native silkworm fibroin fibers to form a silk-fiber-based matrix. Immunogenic components in the silk (such as sericin) may be removed from native silk fiber if such silk fiber based matrix is to be used as implantable materials. These silk fiber based matrix may be used to produce tissue materials for surgical implantation into a compatible recipient, e.g., for replacement or repair of damaged tissue. Some non-limiting examples of tissue materials that can be produced include ligaments or tendons such as anterior cruciate ligament, posterior cruciate ligament, rotator cuff tendons, medial collateral ligament of the elbow and knee, flexor tendons of the hand, lateral ligaments of the ankle and tendons and ligaments of the jaw or temporomandibular joint; cartilage (both articular and meniscal), bone, muscle, skin and blood vessels. Methods of making tissue materials or medical device using silk-fiber based matrix or silk composite containing silk fibers may be found in, e.g., U.S. Pat. No. 6,902,932, Helically organized silk fibroin fiber bundles for matrices in tissue engineering; U.S. Pat. No. 6,287,340, Bioengineered anterior cruciate ligament; U.S. Patent Application Publication Nos. 2002/0062151, Bioengineered anterior cruciate ligament; 2004/0224406, Immunoneutral silk-fiber-based medical devices; 2005/0089552, Silk fibroin fiber bundles for matrices in tissue engineering; 20080300683, Prosthetic device and method of manufacturing the same; 2004/0219659, Multi-dimensional strain bioreactor; 2010/0209405, Sericin extracted silkworm fibroin fibers, which are incorporated by reference in their entirety.

Silk fibers produced from the method of the invention may be incorporated into textile (e.g., yarns, fabrics) and textile-based structures using traditional textile-processing equipment, including winding, twisting, flat braiding, weaving, spreading, crocheting, bonding, tubular braiding, knitting, knotting, and felting (i.e., matting, condensing or pressing) machines. Such textiles can be incorporated in composite materials and structures through many known composite-manufacturing processes.

Silk fibers produced from the method of the invention may be combined with other forms of silk material, such as silk films (WO2007/016524), coatings (WO2005/000483; WO2005/123114), microspheres (PCT/US2007/020789), layers, hydrogel (WO2005/012606; PCT/US08/65076), mats, meshes, sponges (WO2004/062697), 3-D solid blocks (WO2003/056297), etc., to form an all-silk composite. The silk composite material can be reinforced by silk fiber, as well as incorporate the optical property of silk optical fiber into the composite. For example, a one, two or three-dimensional silk composite may be prepared by exposing silk fiber with silk fibroin solution and drying or solidifying the silk fibroin solution containing the silk fiber of the invention to form the silk composite. Different solidifying processes and additional approaches for processing silk fibroin solution into different formats of silk materials can be used. See, e.g., WO/2005/012606; WO/2008/150861; WO/2006/042287; WO/2007/016524; WO 03/004254, WO 03/022319; WO 04/000915.

Moreover, silk fiber produced by the method of the invention can be combined with one or more other natural or synthetic biocompatible or non-biocompatible polymers, and incorporated into a composite with different material formats, such as fibers, films, coatings, layers, gels, mats, meshes, hydrogel, sponges, 3-D scaffold, and the like. The non-limiting biocompatible polymers include polyethylene oxide, polyethylene glycol, collagens (native, reprocessed or genetically engineered versions), polysaccharides (native, reprocessed or genetically engineered versions, e.g. hyaluronic acid, alginates, xanthans, pectin, chitosan, chitin, and the like), elastin (native, reprocessed or genetically engineered and chemical versions), agarose, polyhydroxyalkanoates, pullan, starch (amylose amylopectin), cellulose, cotton, gelatin, fibronectin, keratin, polyaspartic acid, polylysin, alginate, chitosan, chitin, poly lactide, poly glycolic, poly(lactide-co-glycolide), poly caproloactone, polyamides, polyanhydrides, polyaminoacids, polyortho esters, poly acetals, proteins, degradable polyurethanes, polysaccharides, polycyanoacrylates, glycosamino glycans (e.g., chrondroitin sulfate, heparin, etc.), and the like. Exemplary non-biodegradable polymers include polyamide, polyester, polystyrene, polypropylene, polyacrylate, polyvinyl, polycarbonate, polytetrafluorethylene and nitrocellulose material. When incorporating silk fiber into the composite, one or more of these aforementioned polymers can be combined. See also, e.g., U.S. Pat. No. 6,902,932; U.S. Patent Application Publication Nos. 2004/0224406; 2005/0089552; 2010/0209405.

The geometry and properties of composite materials containing the silk fiber of the invention can be tailored to specific applications. For example, single fiber layers have been shown to be very tough and flexible. Cylindrical mandrels can be used to produce very stiff rod or tubular constructs that can have impressive compressive, tensile, flexural, and torsional properties. Custom wavy or highly curved geometries can also be produced.

The composite material generally enhances the matrix properties such as mechanical strength, porosity, degradability, and the like, and also enhances cell seeding, proliferation, differentiation or tissue development when used as medical suture or implantable tissue materials.

Silk fibroin in the silk fiber can also be chemically modified with active agents in the solution, for example through diazonium or carbodiimide coupling reactions, avidin-biodin interaction, or gene modification and the like, to alter the physical properties and functionalities of the silk protein. See, e.g., PCT/US09/64673; PCT/US10/42502; PCT/US2010/41615; U.S. patent application Ser. No. 12/192,588.

Silk fiber of the invention may include at least one active agent. The agent may be embedded in the fiber or immobilized on the surface of the fiber. The active agent may be a therapeutic agent or biological material, such as chemicals, cells (including stem cells) or tissues, proteins, peptides, nucleic acids (e.g., DNA, RNA, siRNA), nucleic acid analogues, nucleotides, oligonucleotides or sequences, peptide nucleic acids(PNA), aptamers, antibodies or fragments or portions thereof (e.g., paratopes or complementarity-determining regions), antigens or epitopes, hormones, hormone antagonists, cell attachment mediators (such as RGD), growth factors or recombinant growth factors and fragments and variants thereof, cytokines, enzymes, antioxidants, antibiotics or antimicrobial compounds, anti-inflammation agents, antifungals, viruses, antivirals, toxins, prodrugs, drugs, dyes, amino acids, vitamins, chemotherapeutic agents, small molecules, and combinations thereof. The agent may also be a combination of any of the above-mentioned active agents.

Exemplary antibiotics suitable for use herein include, but are not limited to, aminoglycosides (e.g., neomycin), ansamycins, carbacephem, carbapenems, cephalosporins (e.g., cefazolin, cefaclor, cefditoren, cefditoren, ceftobiprole), glycopeptides (e.g., vancomycin), macrolides (e.g., erythromycin, azithromycin), monobactams, penicillins (e.g., amoxicillin, ampicillin, cloxacillin, dicloxacillin, flucloxacillin), polypeptides (e.g., bacitracin, polymyxin B), quinolones (e.g., ciprofloxacin, enoxacin, gatifloxacin, ofloxacin, etc.), sulfonamides (e.g., sulfasalazine, trimethoprim, trimethoprim-sulfamethoxazole (co-trimoxazole)), tetracyclines (e.g., doxycyline, minocycline, tetracycline, etc.), chloramphenicol, lincomycin, clindamycin, ethambutol, mupirocin, metronidazole, pyrazinamide, thiamphenicol, rifampicin, thiamphenicl, dapsone, clofazimine, quinupristin, metronidazole, linezolid, isoniazid, fosfomycin, or fusidic acid.

Exemplary cells suitable for use herein may include, but are not limited to, progenitor cells or stem cells (e.g., bone marrow stromal cells), ligament cells, smooth muscle cells, skeletal muscle cells, cardiac muscle cells, epithelial cells, endothelial cells, urothelial cells, fibroblasts, myoblasts, chondrocytes, chondroblasts, osteoblasts, osteoclasts, keratinocytes, hepatocytes, bile duct cells, pancreatic islet cells, thyroid, parathyroid, adrenal, hypothalamic, pituitary, ovarian, testicular, salivary gland cells, adipocytes, and precursor cells.

Exemplary antibodies include, but are not limited to, abciximab, adalimumab, alemtuzumab, basiliximab, bevacizumab, cetuximab, certolizumab pegol, daclizumab, eculizumab, efalizumab, gemtuzumab, ibritumomab tiuxetan, infliximab, muromonab-CD3, natalizumab, ofatumumab omalizumab, palivizumab, panitumumab, ranibizumab, rituximab, tositumomab, trastuzumab, altumomab pentetate, arcitumomab, atlizumab, bectumomab, belimumab, besilesomab, biciromab, canakinumab, capromab pendetide, catumaxomab, denosumab, edrecolomab, efungumab, ertumaxomab, etaracizumab, fanolesomab, fontolizumab, gemtuzumab ozogamicin, golimumab, igovomab, imciromab, labetuzumab, mepolizumab, motavizumab, nimotuzumab, nofetumomab merpentan, oregovomab, pemtumomab, pertuzumab, rovelizumab, ruplizumab, sulesomab, tacatuzumab tetraxetan, tefibazumab, tocilizumab, ustekinumab, visilizumab, votumumab, zalutumumab, and zanolimumab.

Exemplary enzymes suitable for use herein include, but are not limited to, peroxidase, lipase, amylose, organophosphate dehydrogenase, ligases, restriction endonucleases, ribonucleases, DNA polymerases, glucose oxidase, laccase, and the like.

Additional active agents to be used herein include cell growth media, such as Dulbecco's Modified Eagle Medium, fetal bovine serum, non-essential amino acids and antibiotics; growth and morphogenic factors such as fibroblast growth factor, transforming growth factors, vascular endothelial growth factor, epidermal growth factor, platelet derived growth factor, insulin-like growth factors), bone morphogenetic growth factors, bone morphogenetic-like proteins, transforming growth factors, nerve growth factors, and related proteins (growth factors are known in the art, see, e.g., Rosen & Thies, CELLULAR & MOLECULAR BASIS BONE FORMATION & REPAIR (R.G. Landes Co.); anti-angiogenic proteins such as endostatin, and other naturally derived or genetically engineered proteins; polysaccharides, glycoproteins, or lipoproteins; anti-infectives such as antibiotics and antiviral agents, chemotherapeutic agents (i.e., anticancer agents), anti-rejection agents, analgesics and analgesic combinations, anti-inflammatory agents, and steroids.

In some embodiments, the active agent may also be an organism such as a bacterium, fungus, plant or animal, or a virus. Moreover, the active agent may include neurotransmitters, hormones, intracellular signal transduction agents, pharmaceutically active agents, toxic agents, agricultural chemicals, chemical toxins, biological toxins, microbes, and animal cells such as neurons, liver cells, and immune system cells. The active agents may also include therapeutic compounds, such as pharmacological materials, vitamins, sedatives, hypnotics, prostaglandins and radiopharmaceuticals.

Additional applications for silk optical fibers drawn from silk egels include photomechanical actuation, electro-optic fibers, and smart materials.

When the silk fibers of the present invention is used in the textile, medical suture materials or tissue materials, either separately or combined into a composite, stimulus can be incorporated in the aforementioned method of producing the textile medical suture materials or tissue materials. For example, chemical stimuli, mechanical stimuli, electrical stimuli, or electromagnetic stimuli can also be incorporated herein. Because the silk fiber of the invention possess light-transmission property, the silk fiber contained in the textile, medical suture materials or tissue materials can be used to transmit the optical signals that may be from the stimuli or converted from the stimuli originated from the environment (e.g., tissue, organ or cells when used as implant materials) and influence the properties of the textile, suture or tissue materials. Alternatively, silk optical fiber may be used to transmit the optical signal to the applied medium, such as cells or tissues when used as implant materials, and modulate the activities of the cells or tissues. For example, cell differentiation is known to be influenced by chemical stimuli from the environment, often produced by surrounding cells, such as secreted growth or differentiation factors, cell-cell contact, chemical gradients, and specific pH levels, to name a few. Some stimuli are experienced by more specialized types of tissues (e.g., the electrical stimulation of cardiac muscle). The application of such stimuli that may be directly or indirectly transmitted by optical signal is expected to facilitate cell differentiations.

Additionally, a controlled drug delivery system may be made available by incorporating the silk optical fiber into the system, for example, the drug administration and release can be controlled in a manner that precisely matches physiological needs through the external stimuli applied on the silk optical fiber.

Figure 8A:
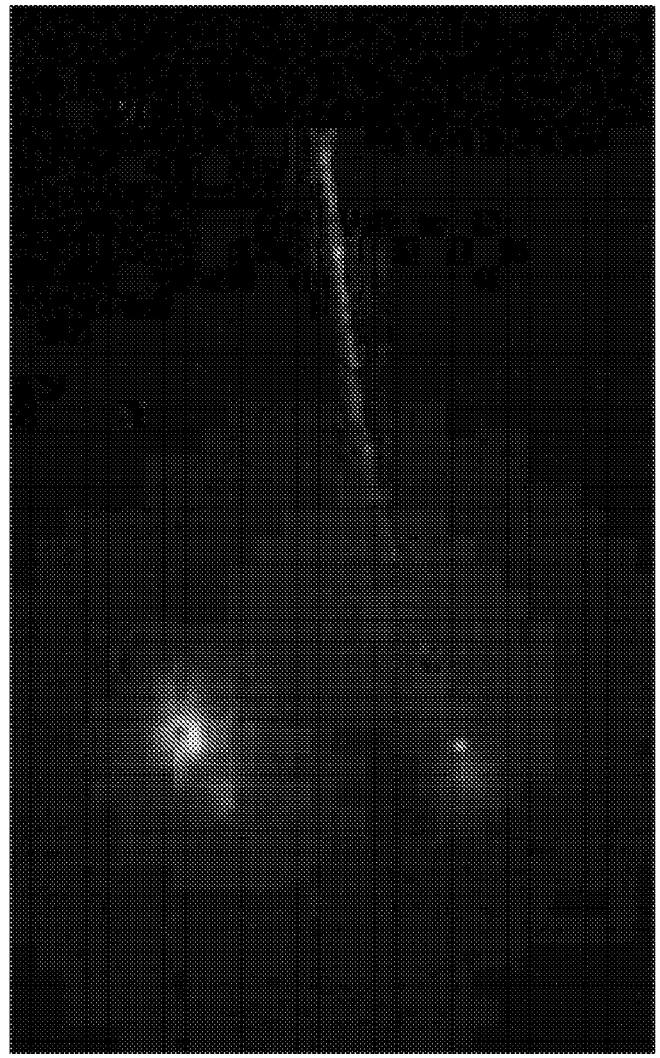
FIGS. 8A-8B presents images that demonstrate the ability for the drawn silk egel fibers to transmit light: (8A) light projects from the end of the drawn silk egel fiber; and (8B) bent fiber is glowing with light.
Figure 8B:

In physics, there is a phenomenon called refraction, where light "bends" upon entering medium with different indexes of refraction. There is a certain angle, called the critical angle, at which a light ray can enter the first medium and then travel between the two mediums, without crossing into the second medium. If the angle at which the ray passes through the first medium is greater than the critical angle, the ray will experience total internal reflection, where it will just reflect off the surface between the two mediums and reenter the first medium. This is the case with contemporary optical fibers. The silk optical fiber of the present embodiments is well-able to conduct light while bent, as shown in FIG. 8b.

The silk-based optical fibers of the present invention may be used, for example, in systems for endoscopy which combine fiber optics and powerful lenses. The medical device may include objective lenses, rod lenses, ocular lenses, light fibers, light source, camera for imaging. A micro-camera may be attached to the eyepiece and an image viewed on a monitor. The endoscopy system may use charge-coupled devices that capture and store image data. For example, a 2D array of individual elements that can store an electric charge, and can respond to 70% of the incident light. Light sourced include tungsten filament lamp, halogen reflector lamp, rare-earth xenon lamp give high intensity light and true color display (xenon daylight effect). The typical flexible endoscope has a bending radius of about 15 mm and two silk fiber optic cables: one is a light conduit (incoherent), second is used to image transmission (coherent). The image fiber may have an image resolution of approximately 10,000 pixels per square mm. Applications for endoscopy include surgical imaging systems that can simulate the optimal path for the surgeon (e.g., inside the brain for neurosurgery). In laser, brain surgery within the skull, the endoscopic device is threaded like a wire through a one-eighth-inch incision in the skull, implanted in the tumor like a biopsy needle, and turned on for spurts of a few seconds.

Further regarding laser surgery, nonimaging edge-ray concentrators may be well suited to a number of laser fiber optic contact surgical procedures where sizable increases in irradiance are required at maximum collection efficiency, and light must be emitted uniformly over a wide angular range. Compared to earlier fiber optic devices developed for these tasks, the delivered irradiance from nonimaging designs can be more than double, at maximum radiative efficiency, while producing a Lambertian absorber, i.e., uniform emission over the entire hemisphere. Additional modifications of the egel drawing process are supported by the disclosure provided herein, including automation, that may improve the generation of controllable and consistent fiber diameters, and may eliminate the bifurcation anomalies. Further optimizing and characterizing silk egel drawing, improving the quality control of the fibers, generating improved light-carrying fibers, and exploring further the hydration-driven contraction and elongation are within the scope of the present invention.

Particular embodiments of the invention are described in non-limiting examples.

The present invention may be as defined in any one of the following numbered paragraphs:

1. A method of producing a silk fiber comprising:
   applying an electric field to a solubilized silk fibroin solution to create a silk fibroin gel;
   converting the silk fibroin gel to a viscous silk liquid;
   drawing a silk fiber from the viscous silk liquid.
2. The method of paragraph 1, wherein converting the silk fibroin gel to the viscous silk liquid comprises quenching the silk fibroin gel in water.
3. The method of paragraph 2, wherein the water has a temperature at or below 0° C.
4. The method of paragraph 2, wherein the water has a temperature in the range from 40° C. to 80° C.
5. The method of paragraph 2, wherein drawing the silk is performed at a temperature within the range of 10° C. to 40° C.
6. The method of paragraph 2, wherein converting the silk fibroin gel to the viscous silk liquid further comprises heating the silk fibroin gel prior to the quenching step.
7. The method of paragraph 6, wherein the silk fibroin gel is heated to a temperature higher than the temperature of water used in the quenching step.
8. The method of paragraph 1, further comprising drying the silk fiber.
9. The method of paragraph 1, further comprising contracting the silk fiber
10. The method of paragraph 9, wherein contracting the silk fiber includes reducing the ambient humidity to which the silk fiber is exposed.
11. The method of paragraph 1, further comprising expanding the silk fiber.
12. The method of paragraph 11, wherein expanding the silk fiber includes increasing the ambient humidity to which the silk fiber is exposed.
13. The method of paragraph 1, further comprising processing the silk fiber with an alcohol treatment or water annealing treatment to generate a water-insoluble silk fiber.
14. The method of paragraph 1, further comprising wrapping a plurality of the silk fibers.
15. The method of paragraph 1, further comprising wrapping at least one of the silk fibers with at least one other fiber.
16. The method of paragraph 15, wherein the other fiber comprises at least one sericin-extracted silk natural fibroin fiber.
17. The method of paragraph 1, further comprising incorporating at least one silk fiber into a composite.
18. The method of paragraph 17, wherein the composite is all-silk composite.
19. The method of any one of the proceeding paragraphs, wherein the silk fiber is an optical fiber.
20. The method of paragraph 19, further comprising forming a fiber optic cable with the silk optical fiber.
21. The method of paragraph 19, further comprising transmitting a light signal through the silk optical fiber.
22. The method of paragraph 21, wherein the transmitting step comprises receiving, by the silk optical fiber, an incident light from a light source.

23. The method of paragraph 21, wherein the transmitting step comprises receiving, by the silk optical fiber, a light signal converted from stimuli from the environment of the silk optical fiber.
24. The method of paragraph 19, wherein the silk optical fiber is a waveguide.
25. The method of paragraph 19, wherein the silk optical fiber is a multi-mode fiber.
26. The method of paragraph 19, wherein the silk optical fiber is a single mode fiber.
27. A composition prepared from the method of any one of the proceeding paragraphs.

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

As used herein and in the claims, the singular forms include the plural reference and vice versa unless the context clearly indicates otherwise. Other than in the operating examples, or where otherwise indicated, all numbers expressing quantities of ingredients or reaction conditions used herein should be understood as modified in all instances by the term "about."

All patents and other publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Unless defined otherwise, all technical and scientific terms used herein have the same meaning as those commonly understood to one of ordinary skill in the art to which this invention pertains. Although any known methods, devices, and materials may be used in the practice or testing of the invention, the methods, devices, and materials in this regard are described herein.

EXAMPLES

Example 1

Effect of Elevated Temperature on Egel

Solubilized silk fibroin aqueous stock solutions were prepared as described previously. Sofia et al., 54 J. Biomed. Mater. Res. A 139-48 (2001). Briefly, cocoons of *B. mori* were boiled for 20 min in an aqueous solution of 0.02 M sodium carbonate, and then rinsed thoroughly with water (ultra-pure water processed via Milli-Q® Water System, Millipore, Billerica, Mass.). After drying, the extracted silk fibroin was dissolved in a 9.3 M LiBr solution at 60° C. for 4 hr, yielding a 20% (w/v) solubilized silk fibroin solution. The resulting solution was dialyzed against distilled water using Slide-A-Lyzer® 3.5K MWCO dialysis cassettes (Pierce, Rockford, Ill.) for three days to remove the residual salt. The solution was optically clear after dialysis and was centrifuged twice at 10,000 rpm for 20 min to remove silk aggregates as well as debris from original cocoons. The final concentration of solubilized silk fibroin aqueous solution was approximately 8% (w/v). This concentration was determined by drying the solution with a known volume and weighing the residual solid. The 8% silk fibroin solution was stored at 4° C. and diluted with water before use.

To explore the effects of heat on electrogelation, about 8% w/v solubilized silk fibroin solution was heated to about 60° C.-75° C. Using a "standard" egel setup that consists of the bottom half of a Falcon tube and two platinum (Pt) electrodes submerged in the heated solution, 25 VDC was applied with an Agilent 3364A power supply. Surprisingly, no visible gel formed on the positive electrode, which is the typical response in electrogelation. Perhaps the heating of silk solution somehow permanently affects the ability to perform electrogelation on the silk. Prior evidence supported this idea; an autoclaved volume of silk solution at 121° C. would not produce observable gel using electrogelation. The autoclaved silk solution "recovered" over time, however. After a week of storage at 5° C.-10° C., the autoclaved silk solution exhibited some electrogelation response, albeit reduced. As subsequent experiments appeared to suggest, the electrogelation of a heated silk solution may have changed the conformation of the silk solution from random coil to silk I, but that the material was not staying in contact with the positive (typically platinum) electrode.

Example 2

Effect of Elevated Temperature on Egel II

Electrogelated silk was first created in a "standard" setup (8% w/v silk solution, platinum electrodes, and Falcon tube as above). After 10 min of electrogelation, the gel which formed on the positive electrode was transferred to a beaker containing water heated to 60° C.-75° C. FIG. 1 shows images of the gel response at 10 sec time intervals. Upon immersion in the warm water, the egel on the Pt seemed to dissociate and fall to the base of the beaker, apparently due a density differential. Simultaneously, any bubbles trapped in the egel rose to the water surface as they were released. The dissociation process continued until it appeared only β-sheet material was remaining on the Pt electrode. It should be noted that over an extended period of electrogelation, the silk solution that is in closest proximity to the positive electrode at the start of electrogelation tends to continue to convert to an irreversible conformation (assumed to be β-sheet), while the vast majority of the gel attains a silk I conformation. The material collected on the base of the bath in a coherent viscous fluid puddle.

Example 3

Drawing of Egel Fiber I

Figure 2:
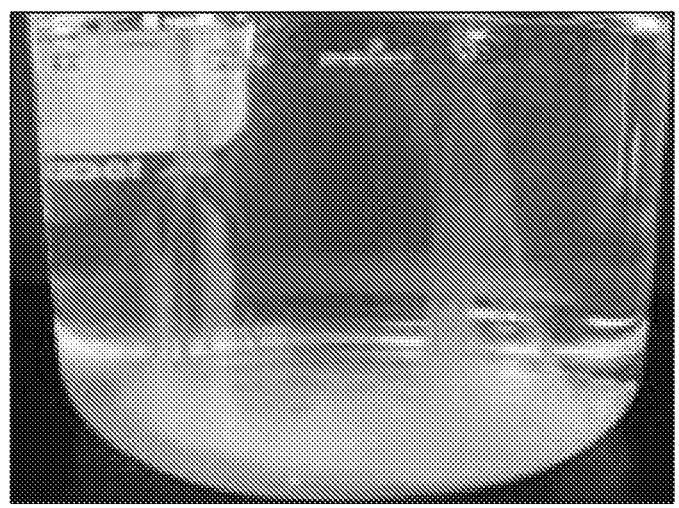
FIG. 2 is a photograph showing formation of silk egel "structures" in 60° C.-75° C. water.
Figure 3D:
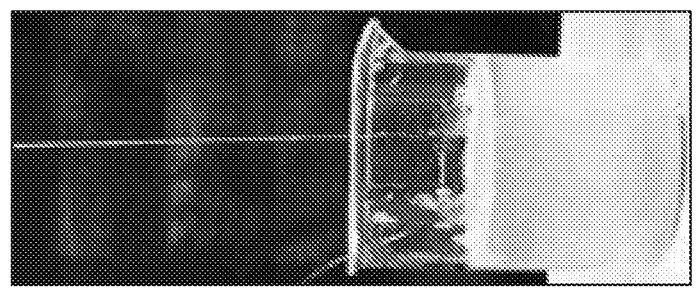
FIGS. 3A-3D show a series of time lapse photographs showing fiber drawing of egel from a 60° C.-70° C. water bath.
Figure 3C:
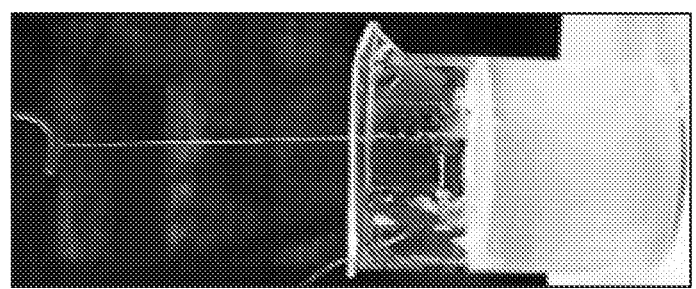
Figure 3B:
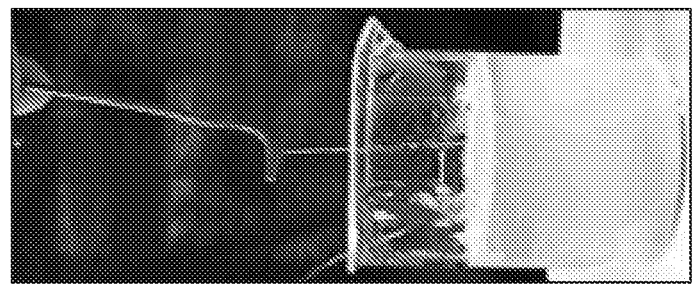
Figure 3A:
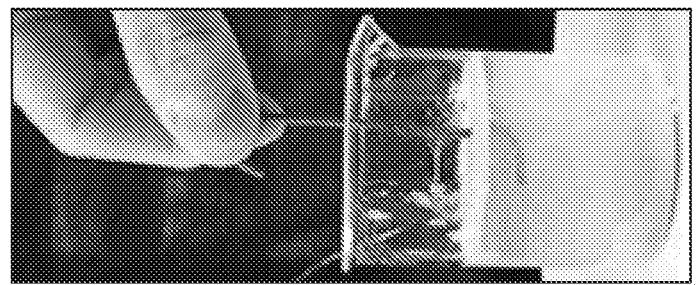

Using the beaker of warm water and dissociated silk from Example 2, the utility of the curious material was explored. Using an insulated wire with a hook-shape tip, the viscous puddle of silk could be pulled upward in the heated water to form a "structure." It was obvious when manipulating the material at varying bath temperatures that temperature is an important factor in maintaining a coherent structure. The structure itself had the consistency of seaweed being pulled from the surface of the ocean. As shown in FIG. 2, a series of "fibers" could be drawn up to the surface of the water. Interestingly, the "fibers" would stay in place. Perhaps this is due to the "fiber" ends attaching to impurities at the water surface, due to surface adhesion, or due to neutral buoyancy achieved when the stretched material approximately matched the density of the water. In this way, three-dimensional structures could be formed, including sheet-like geometries.

When one "fiber" is drawn out of the water bath, it can be stretched to very long lengths. One key appears to be the temperature of the water bath. Qualitative information showed that a bath temperature of about 60° C. generated the best results. At cooler temperatures, the "fiber" would break even before bringing it to the water surface. At higher temperatures, the "fiber" acts less viscous, which would prevent formation of a "fiber" at all. FIG. 3 shows time lapse photos of a "fiber" being drawn out of the heated bath. The fiber was drawn up at a rate of about 1 inch/second. Initial success led to fiber lengths of between 40 and 50 inches. The fiber lengths could be longer, depending on the amount of silk in the water, the temperature of the water, and the drawing rate. The drawn fibers were very sticky (if two fibers tangled, they would stick together). Over a period of minutes, the fiber would become thinner, less sticky, and more brittle. After between 40 min and 60 min, the fibers could be handled without becoming stuck to other surfaces or itself. Perhaps the solidification is due to a drying effect, where water entrained in the fiber was evaporating. After drying, the fibers had surprising strength, but would quickly become soft when rehydrated in water (especially warm water).

Example 4

Response of Egel to Temperature Swings

Figure 4C:
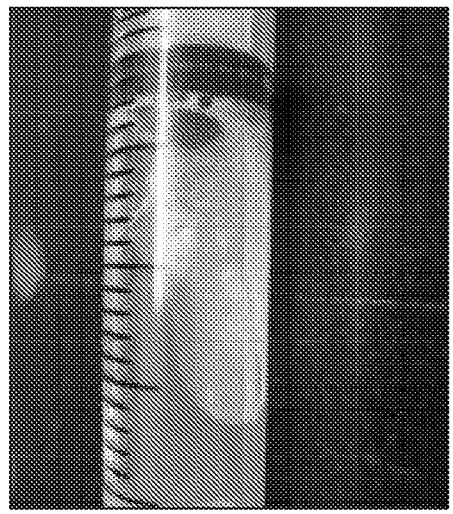
FIGS. 4A-4C show silk egel (4A) before heating; (4B) with heat gun; and (4C) after heating to about 60° C.
Figure 4B:
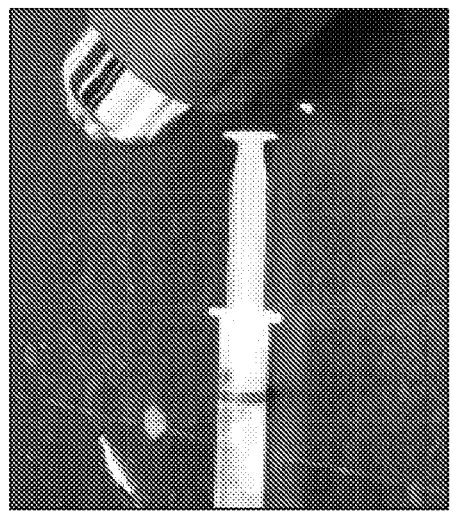
Figure 4A:
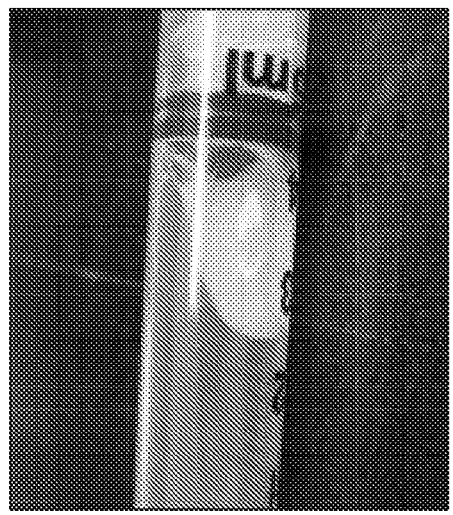

In this experiment, silk egel was placed in a 5 ml plastic syringe. Because egel has an increased silk I conformation over silk solution, which is meta-stable, the egel was placed in the syringe by first removing the syringe plunger and inserting from the plunger end of the syringe. If egel were drawn into the syringe through a syringe needle, flow-induced shear would likely cause some conformation change to β-sheet, which would fundamentally affect the experiment. The silk egel before heating is shown in FIG. 4a. Using a heat gun on a medium heat setting (FIG. 4b), the egel was heated above 60° C. While heating, the egel became a liquid. When the internal temperature approached 60° C., the entire volume of gel had become liquid, as shown in FIG. 4c. After removal of the heat source, the liquid solution converted back to a gel, with very similar characteristics to egel. It appears that the reconstituted gel might be somewhat stickier than the original egel and more transparent in appearance. This implies that egel conformation and stickiness can be "turned on" and "turned off" through thermal cycling. In many applications this can be an attractive alternative to cycling using electrical charging with polarity reversal.

Example 5

Response of Egel to Temperature Cycling

Figure 5C:
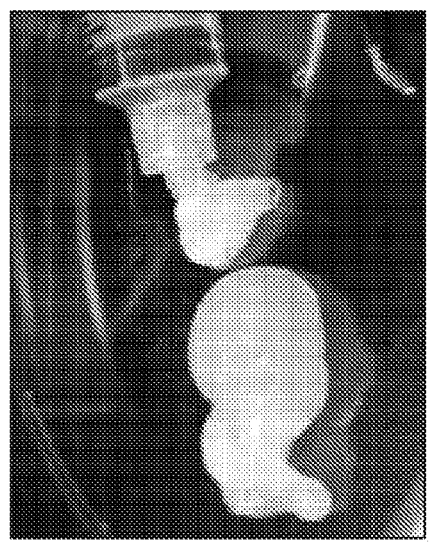
FIGS. 5A-5C show silk egel: (5A) before heating; (5B) in water bath to cool down; and (5C) after extrusion from syringe.
Figure 5B:
Figure 5A:
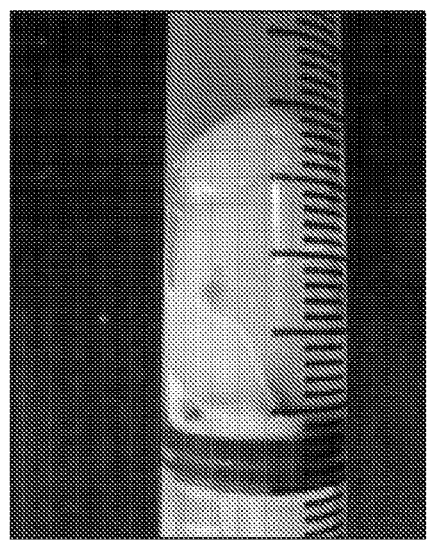

In a follow-up experiment, the same egel-syringe-heat gun experiment was conducted, with one modification. The syringe plunger was modified by drilling an access hole, through which a small diameter, type T thermocouple was installed. FIG. 5a shows the syringe and gel, with the thermocouple visible in the center of the image. This thermocouple was used to monitor temperature of the egel and liquid throughout the experiment with National Instruments' CompactDAQ data acquisition hardware and LabVIEW software. This experiment was conducted by performing two complete heating/cooling cycles. A heat gun was used for heating and a water bath for cooling (FIG. 5b). After each phase of the experiment (after each heating and cooling cycle), a small volume of silk material was extracted from the needle end of the syringe (no needle attached), as shown in FIG. 5c. Cycling appears to provide similar results after each cycle—a highly viscous and sticky gel forms upon cool-down, while a much less sticky, low viscosity liquid is formed above about 60° C. When manipulated by hand, the gel that formed after each cooling stage responded similarly to egel that was created before the heating/cooling cycles. The gel could be attached to a vertical surface and stay attached or be rolled into a rubbery ball. In simple terms, it appears that the silk conformation found in egel can be reversibly brought to a more random coil conformation and back again.

Example 6

Drawing of Egel Fiber II

Following the protocol from experiment 3 above, this experiment included the use of a type T thermocouple and National Instruments' CompactDAQ data acquisition hardware and LabVIEW software to monitor bath temperature. Silk egel was placed into a beaker of water heated to 60° C. After the egel would dissociate and sink to the bottom of the water bath, "fibers" of the liquid silk were drawn upward out of the bath. Depending on speed and height above the water bath, the fibers could be drawn to various diameters. After hanging each drawing fiber on a lab bench shelf, the initially sticky and non-uniform fiber would begin to dry/solidify. The fiber also tended to decrease in diameter and become more uniform. The final fibers exhibited impressive tensile properties, but were fairly brittle. If the dry fibers were wrapped into a curvature of less than about 90° C., they tended to fracture. Although the surface of the fiber was more smooth than after initial drawing, there were still noticeable bumps and rough sections on the fiber.

Additionally, after submerging a volume of egel into a 60° C. water bath, the bath was cooled to room temperature, the water was removed from the upper region of the water bath (separation between water and silk was visible), and the remaining material was left at room temperature overnight. After about 18 hours, the remaining material was observed to be a thin silk disc that was opaque white and very tough. It was very moist, but would become very brittle once the water was allowed to evaporate.

Example 7

Extrusion of Heated Egel and Quenching in an Ice Water Bath

Figure 6A:
FIGS. 6A-6B show heated silk egel quenched in an ice bath: (6A) after initial quenching; and (6B) after about 1 minute.
Figure 6B:
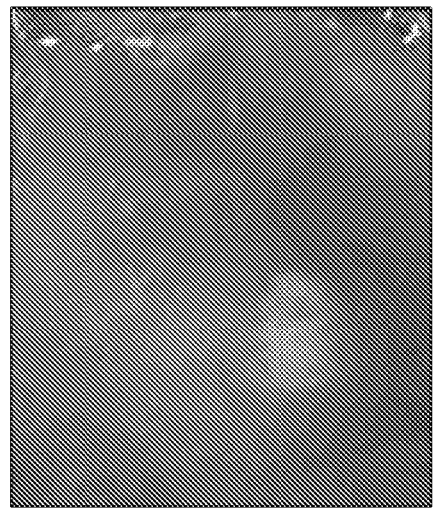

As a way to speed up the formation of a fiber, an ice bath was created using a beaker of tap water and ice chips. The temperature was measured to be around 0° C. Using a 10 ml plastic syringe, silk egel was first heated to above 60° C. with a heat gun set to medium. The egel was extruded through the needle end of the syringe (no needle attached) into the ice bath. Upon introduction into the cold water, the gel formed a vertical "fiber" that tended to stay suspended in the water, as shown in FIG. 6a. The appearance of the gel tended to change from fairly transparent to a whitish color, as shown in FIG. 6b. This was speculated to be due to conversion of the silk I egel conformation to β-sheet. Future materials characterization will confirm this.

Example 8

Drawing of Egel Fiber from Ice Water Bath I

Using the same experimental setup from Example 7, the liquid silk "fiber" that had been quenched in the ice bath was then drawn out of the bath. As before, the fiber could be drawn to a fairly long length. For this experiment, only one fiber was drawn to a length of about 10 inches. The fiber was as sticky as the prior fibers, but more prone to failure during drawing. This fiber appeared to be much more homogeneous, with a fairly smooth surface and consistent cross-sectional geometry. After hanging overnight from a lab bench shelf, the fiber was found to have become smaller in diameter, but overall was much tougher than the prior fibers: It was not as brittle and could withstand considerable tensile loading. The fiber appeared to be fairly transparent, which provides promise that such fibers could be used to transmit light.

Example 9

Tests of Light-Carrying Capability of Drawn Silk Egel Fiber

Figure 7A:
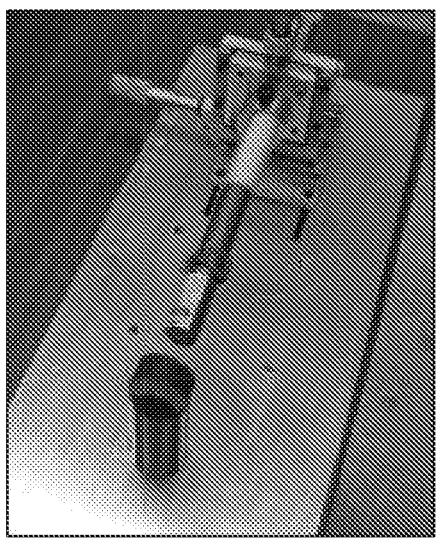
FIGS. 7A-7B depict a custom fixture for exploration of light carrying capability of drawn silk egel fiber: (7A) overall setup; and (7B) zoomed image of fiber holder.
Figure 7B:
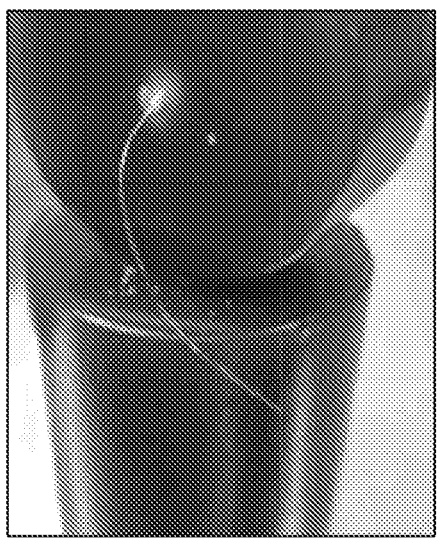

Drawn silk egel fibers appear to be fairly transparent, and may be manufactured and used to transmit light. A simple experimental apparatus was built, as shown in FIG. 7a in which a manual x-y stage was mounted vertically to an aluminum base. A presentation-style laser pointer was held firmly to the stage. A fiber holder was formed using machinable wax. A very small hole was drilled in the wax to snugly hold an egel fiber, as shown in FIG. 7b. The results of the tests, shown in FIG. 8a, laser light was carried through a fiber and projected onto a surface from the fiber end. The figure shows a second light patch above the fiber, which represents the direct transmission of light through the fiber holder hole. FIG. 8b demonstrates the ability of a fiber to transmit light around a bend. Adjustments assured that the images are not due to light reflection on the outside of the fibers.

Example 10

Drawing of Egel Fiber from Ice Water Bath II

Figure 9C:
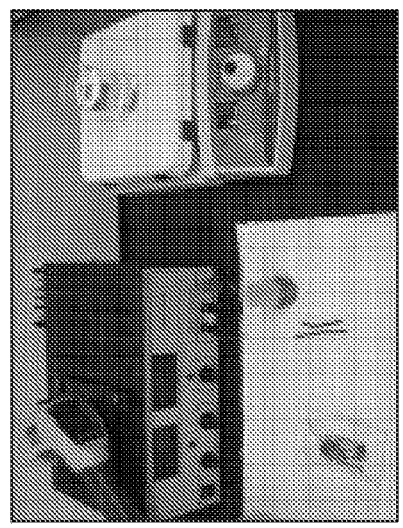
FIGS. 9A-9C show images of (9A) initial egel formation; (9B) after 5 minutes of electrogelation; and (9C) overview of power supply, egel tube setup, IR thermometer for recording temperature, and hot plate.
Figure 9B:
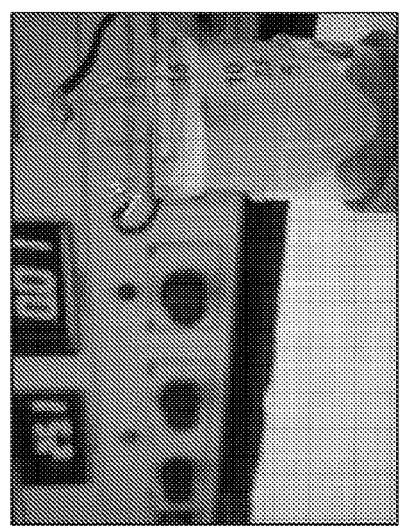
Figure 9A:
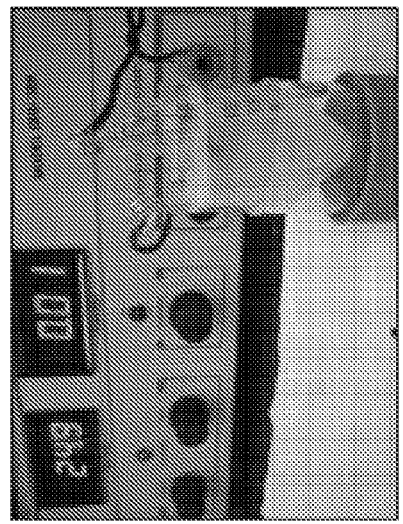
Figure 10C:
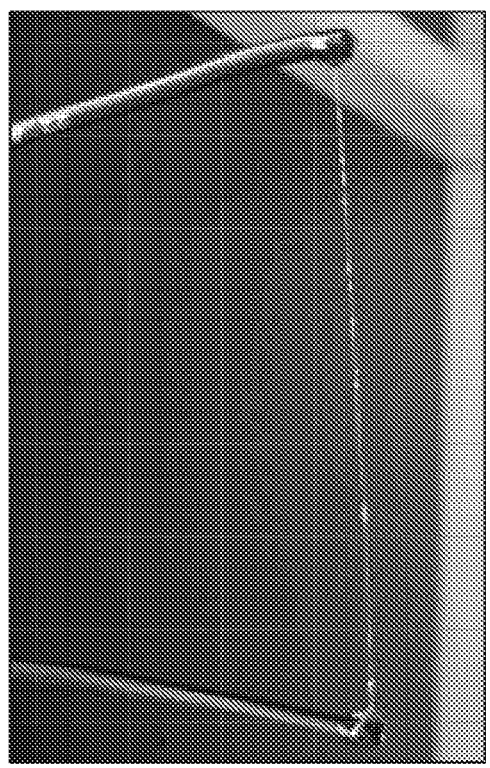
FIGS. 10A-10C depicts egel silk fiber drawing from a ice water bath: (10A) quenching of heated egel into an ice bath; (10B) a egel silk fiber immediately after being drawn from the bath (using an insulated wire); and (10C) a drawn egel silk fiber after some drying in air.
Figure 10B:
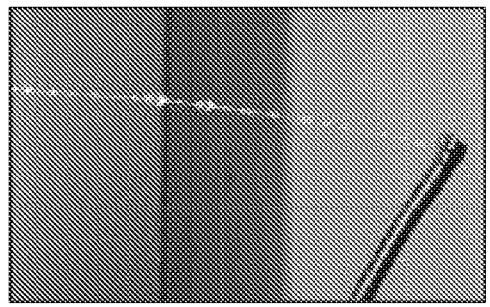
Figure 10A:
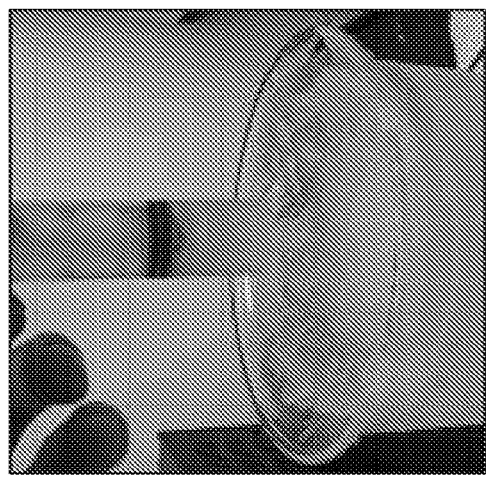
Figure 11:
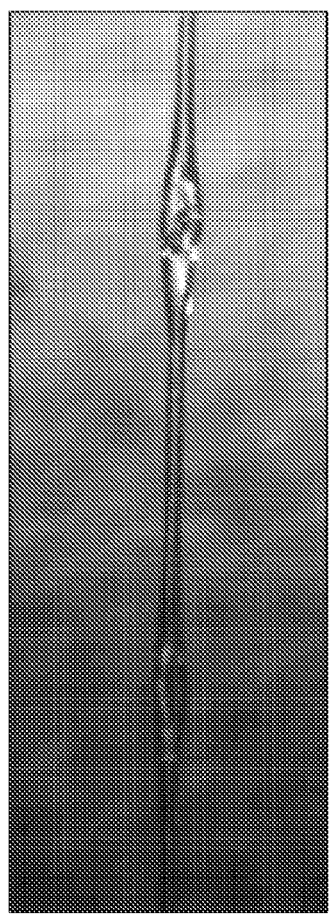
FIG. 11 is a stereo microscope image of a typical egel silk fiber drawn from an ice water bath and dried in ambient air. The diameter between the bifurcations is approximately 100 µm.

Silk egel fibers were drawn from an ice bath after undergoing one heating (60° C.) and quenching (<0° C.) cycle. FIG. 9 shows egel being formed on 3 platinum electrodes in a shortened Falcon tube. As shown, only one negative electrode is necessary. As in Example 7, the silk egel was placed in a 10 ml plastic syringe and heated to above 60° C. with a heat gun set to medium. The egel was extruded through the needle end of the syringe (no needle attached) into an ice bath, as shown in FIG. 10a. As before, the egel material would tend to form a vertical underwater "fiber" that would stay suspended in the water. An insulated wire was used to draw this "fiber" out of the ice bath into ambient air. FIG. 10b shows a fiber immediately after being drawn. FIG. 10c shows a fiber tensioned between two insulated wires after about 30 min of air drying. Note that the beads that appear initially on the drawn fiber tend to dissipate with drying. Pulling on the fiber shows the fiber to be impressively strong for its diameter. In addition, the fibers drawn from the ice bath are quite tough after drying. FIG. 11 shows a stereo microscope image of one of the silk egel fibers that was drawn from the ice water bath. The bifurcations are likely water beads (FIG. 10b) that have dried. In the straight segments between the bifurcations, the fiber diameter is approximately 100 μm. The fiber is noticeably transparent when viewed under a microscope.

Example 11

Exploration of Super-Contraction and Small-Contraction Cycling

Literature suggests that spider dragline silk exhibits two distinctly different contraction responses in the presence of humidity. Dragline silk, a type of silk used to make webs, exhibits supercontraction in high humidity. The contraction, which can reach 50%, is thought to be nature's way of refreshing the web; morning dew will tighten the web. Recent research has shown that spider silk also undergoes a cyclic relaxation-contraction response to smaller changes in humidity. In this case, drying of silk caused stress and contraction, albeit at a much lower magnitude, and an increase in humidity causes elongation as relaxation is induced. Blackledge et al., How super is supercontraction? Persistent versus cyclic responses to humidity in spider dragline silk, 212 J. Experimental Bio. 1981-89 (2009).

Figure 12:
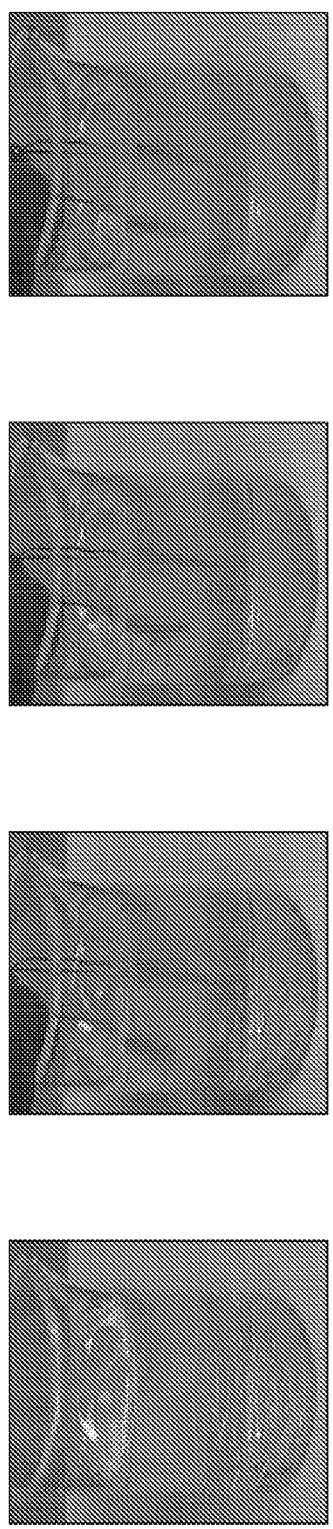
FIG. 12 shows time-lapse photographs of egel silk fibroin submerged in about 60° C. water. Over about a 5 minute period, the silk structure in the gel appears to separate from the water content, falling into a pool at the base of the beaker.
Figure 13A:
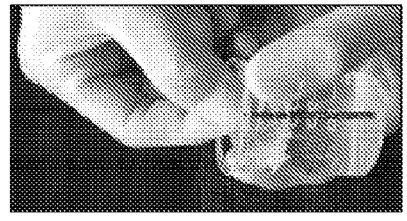
FIGS. 13A-13E show egel silk fiber drawn from a heated bath: (13A-13B) insulated wire dragging through silk pool; (13C-13D) fiber drawn rapidly from the bath.
Figure 13B:
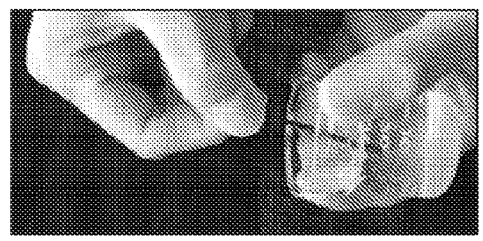
Figure 13C:
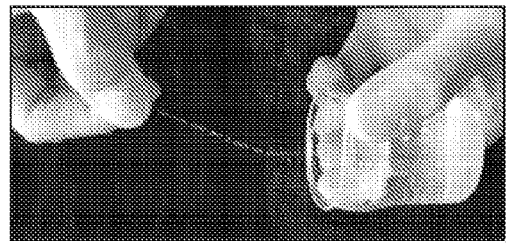
Figure 13D:
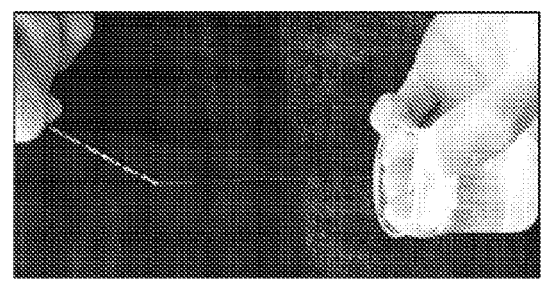
Figure 13E:
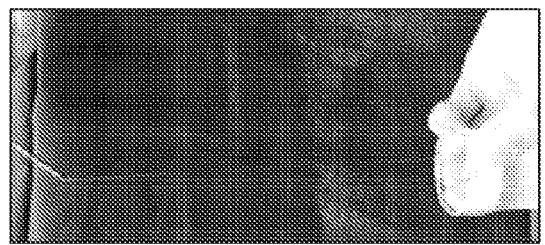

This experiment and subsequent experiments were executed to investigate the ability of drawn egel fibers to exhibit both supercontraction and cyclical contraction/expansion. A Fisher Scientific hot plate (FIG. 9c) was used to heat milli-Q water to about 60° C. Egel was formed using three platinum electrodes, as shown in FIGS. 9a and 9b. The platinum electrodes with the egel attached were submerged in the heated water bath, as shown in FIG. 12, seemingly causing the silk from the egel to separate from the gel's water content. When FIGS. 12c and 12d are studied closely, the silk material can be seen falling into a pool at the base of the beaker. Over a span of 5 min, most of the egel is removed from the electrodes. As the bubbles trapped within the gel are freed, they rise to the water surface. After removal of the beaker from the hot plate, fibers were drawn from the beaker by dragging an insulated wire through the silk pool at the base of the beaker (FIG. 13). Drawn fibers were dried in air by suspending the insulated wires from elevated shelving.

Figure 14E:
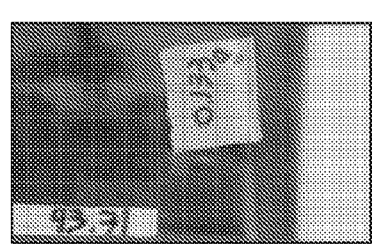
FIGS. 14A-14E are time-lapse photographs of a weighted drawn silk egel fiber: (14A) fiber at ambient humidity with 133 mg weight attached; and (14B-14E) elongation of fiber after 20 seconds of exposure to steam.
Figure 14D:
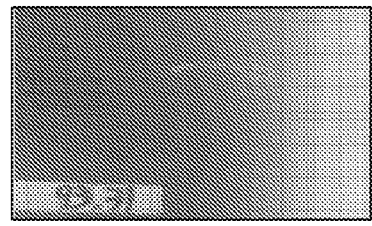
Figure 14C:
Figure 14B:
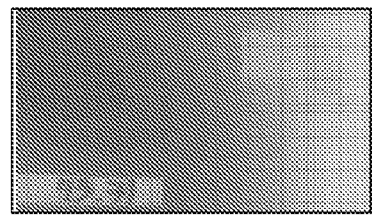
Figure 14A:
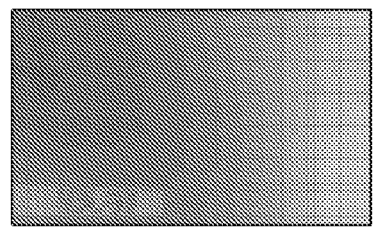

A 93.31 mm-long dried fiber was suspended in an empty 4 L beaker, with a 133 mg weight attached, as shown in FIG. 14a. Boiling water was poured into the beaker and the fiber length was monitored with a camera (FIGS. 14b-e). Significant elongation was seen after the fiber was exposed to the hot steam for about 20 sec. The total elongation exceeded approximately 35% of the original fiber length. After removal of humidity generated by the steam, the fiber contracted almost completely to its original length of about 93 mm.

Figure 17B:
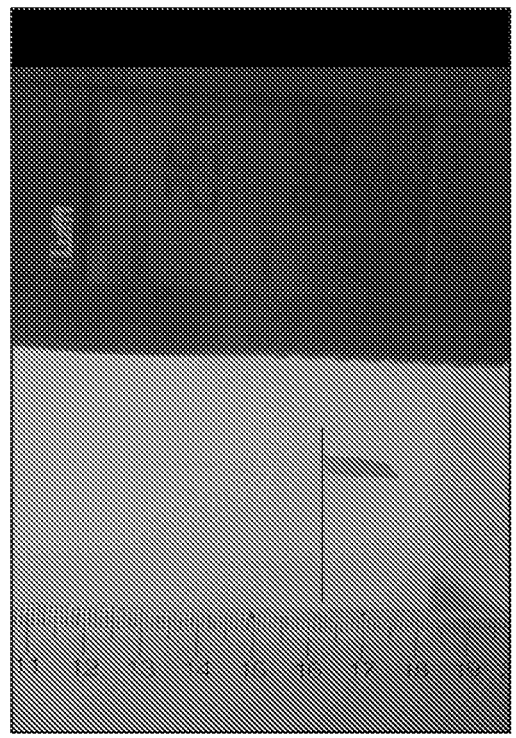
FIGS. 17A-17B exhibits the change in drawn silk egel fiber length: (17A) from 81.7% humidity to (17B) 94.6% humidity.
Figure 17A:
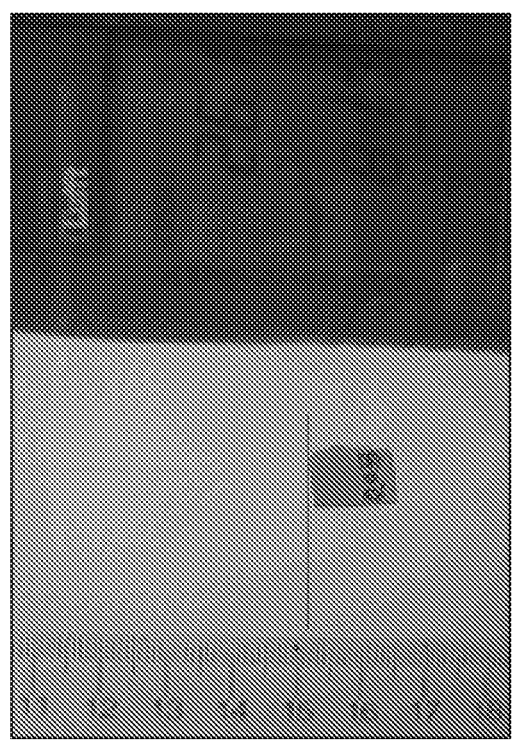
Figure 18D:
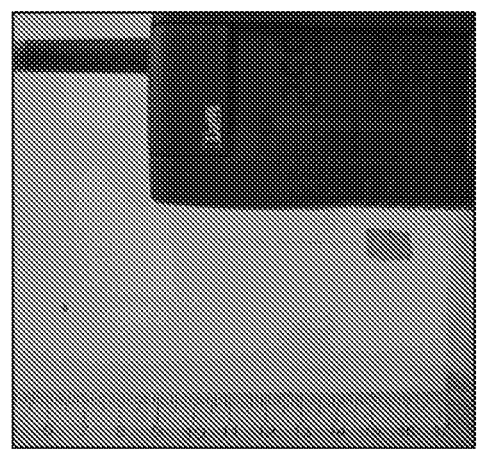
FIGS. 18A-18D represents a comparison of drawn egel silk fiber contraction at relative humidity levels: (18A) 99.7%; (18B) 86.3%; (18C) 71.8%; and (18D) 62.4%.
Figure 18C:
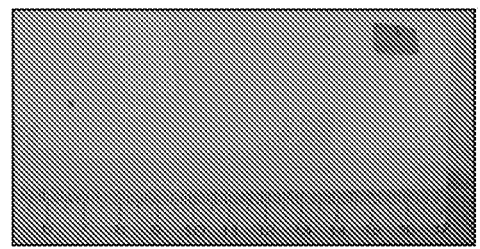
Figure 18B:
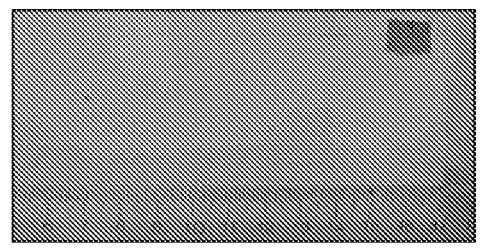
Figure 18A:
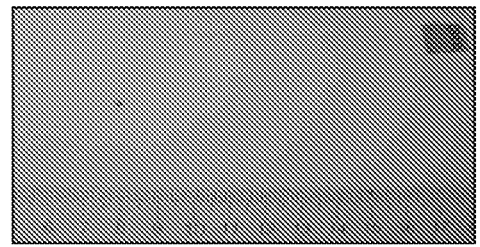

A custom-designed-and-built humidity chamber was fabricated for studying small-contraction cycling. Using ⅛" acrylic, a 24×24×24 in3 chamber was fashioned. A Kaz Model V5100NS Ultrasonic Humidifier, shown in FIG. 15, was positioned inside the chamber, with a capability of bringing the internal humidity from room ambient relative humidity (around 44%) to about 95%. Because the humidifier uses ultrasonic energy to create a humid mist, the chamber temperature does not change appreciably from ambient temperature (around 26° C. on this day of testing). A Lufft C200 hand-held humidity/temperature measurement device was used to monitor chamber conditions. In this experiment, a drawn egel fiber (a quenched fiber) was suspended from the top of the chamber, with a 33 mg weight attached to the end with laboratory-grade tape. The initial fiber length was about 15 cm, as seen in FIG. 16a. With the chamber closed, the ultrasonic humidifier was turned on. In a span of about 2 min, the relative humidity inside the chamber increased from ambient humidity (around 44%) to about 95%. As shown in FIG. 16b (horizontal lines added for clarity), while the humidity increased to about 95%, the drawn egel fiber elongated approximately 1.2 cm, which is about an 8% increase from the original length. After turning off the ultrasonic humidifier and opening the front panel of the chamber, the humidity dropped back to ambient humidity. During the decrease of humidity, the drawn egel fiber contracted nearly to its original length. The total humidity cycle took place over a 4 min time span. The chamber temperature was fairly steady at about 26° C. It should be noted that while the overall elongation/contraction cycle occurred over a 50% relative humidity change, most of the motion was seen over a humidity range of between 82% and 95%, as shown in FIG. 17.

Example 12

Additional Experiment on Small-Contraction Cycling

Using the custom-designed humidity chamber described in Example 11, the contraction behavior of two fibers were compared. Both fibers were cut from the same virgin fiber than was drawn from hot egel (no quenching). The approximately 7.8 mm-long sample had a small piece of tape, with negligible weight, attached to the end to help with length measurement. The second, a 16.5 mm long drawn egel fiber, had a 33 mg piece of tape attached. Although the humidity was cycled from about 50% relative humidity to about 95%, only the drying cycle is shown in FIG. 18. As the humidity decreased, the fibers contracted in length. As shown in Table 1, the incremental amount that each fiber contracted was fairly close between the fibers, despite the disparity in original length. The incremental percentage contraction of the previously cycled fiber was much greater than for the virgin drawn egel fiber.

TABLE 1

Comparison of Fiber Contraction Behavior between a virgin drawn egel fiber and a drawn fiber that had previously undergone humidity cycling

| | Weighted Egel Fiber (33 mg) | | | Unweighted Egel Fiber | | |
|---|---|---|---|---|---|---|
| Humidity | Fiber Length [mm] | Length Change [mm] | % Decrease | Fiber Length [mm] | Length Change [mm] | % Decrease |
| 99.7% | 16.4 | — | — | 7.8 | — | — |
| 86.3% | 15.4 | 1.0 | 6.1% | 7.0 | .8 | 10.3% |
| 71.8% | 15.0 | .4 | 2.6% | 6.6 | .4 | 5.7% |
| 62.4% | 14.8 | .2 | 1.3% | 6.3 | .3 | 4.5% |

Example 13

Tensile Testing of Drawn Egel Fibers

Figure 19:
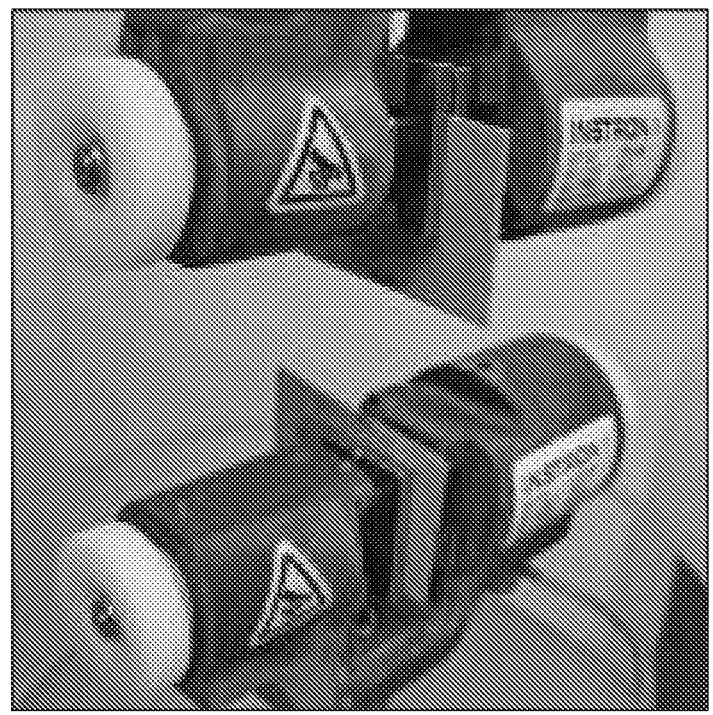
FIG. 19 shows cardboard-mounted fibers positioned in Instron pneumatic grips for tensile tests.
Figure 20:
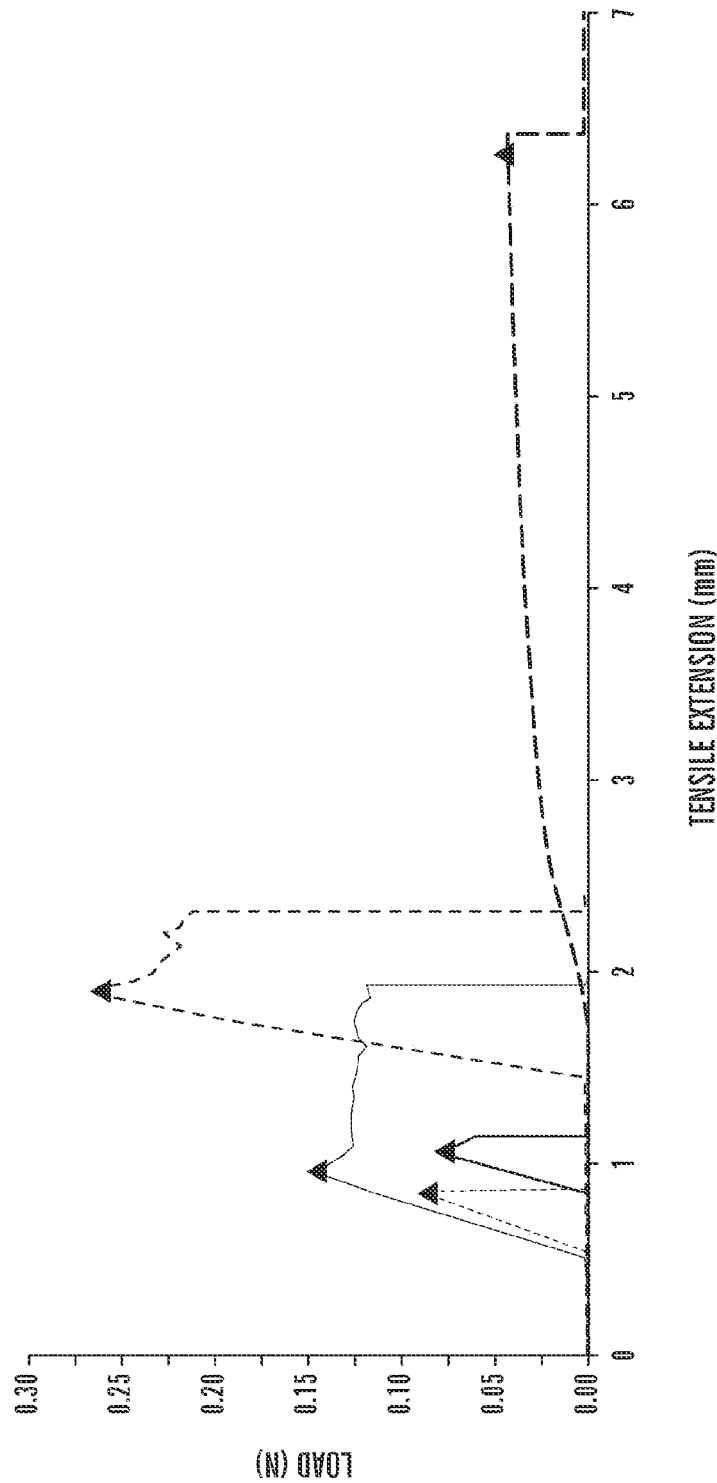
FIG. 20 is a graph showing a comparison of load-extension response between several drawn silk egel fibers.

Tensile testing was performed on several drawn egel fibers and cocoon fiber to compare maximum tensile stress. An Instron 3366 tensile frame was used with a 10 N load cell. Tests were conducted under extension control with a 0.02 in/min extension rate. Fiber samples were mounted to cardboard tabs with super glue. The cardboard tabs were secured to the machine using pneumatic grips, as shown in FIG. 19. The measurement of fiber diameter was a challenge for these tensile tests. They were measured using a Vernier caliper which had a low precision for the small scale of the fibers. A microscope can also be used to determine fiber diameter. FIG. 20 shows the raw load-extension data for five fibers tested: (1) drawn egel fiber that had undergone a humidity cycle (with ultrasonic humidifier); (2) cocoon fiber that was pulled from a virgin silkworm cocoon; (3) another drawn egel fiber from the same cycled fiber as #1; (4) virgin drawn egel fiber that had not undergone a humidity cycle; and (5) drawn egel fiber that had undergone a heated steam cycle (generated with boiling water), as in example 11.

Results showed that the egel fibers were all significantly stiffer than the cocoon fiber. The fibers that had undergone humidity cycles with an ultrasonic humidifier exhibited unique load-extension response from the other two drawn egel samples: while all egel fibers exhibited an initially steep linear elastic response, the cycled fibers exhibited significant plastic strain after a peak load was reached. The virgin silk egel fiber and fiber that was cycled with hot steam both failed catastrophically after their peak load was reached. Table 2 shows the diameter and peak tensile stress for each fiber tested. In general, the smaller the fiber, the greater the tensile strength. This is consistent with published results from both cocoon silk and regenerated silk fibroin fibers and is likely due to heightened alignment that occurs with the draw-down of the fiber diameter. The drawn egel fiber that had undergone humidity cycling with heated steam was, by far, the strongest. It exhibited much higher strength than cocoon fiber.

TABLE 2

Comparison of Maximum Tensile Stress Between Drawn Egel Fibers

| Specimen # | Type of Fiber | Estimated Diameter [μm] | Max. Tensile Stress [MPa] |
|---|---|---|---|
| 1 | drawn egel/ultrasonic humidity cycle | 0.10 | 33.7 |
| 2 | cocoon fiber | 0.01 | 595.4 |
| 3 | drawn egel/ultrasonic humidity cycle | 0.04 | 117.3 |
| 4 | virgin drawn egel fiber | 0.04 | 69.6 |
| 5 | drawn egel/hot steam cycle | 0.01 | 1015.7 |

Example 14

Imaging of Drawn Silk Egel Fibers

Figure 21B:
FIG. 21A-21B is a stereo microscope and images of three drawn egel fibers produced under unique conditions (1 mm scale bar).
Figure 21A:
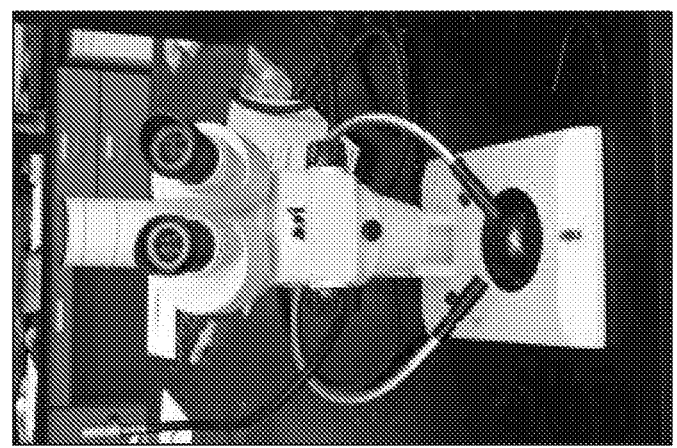

Images of individual fibers were captured using a digital camera and stereo microscope, as shown in FIG. 21a. FIG. 21b shows images of three drawn egel fibers: a fiber that had undergone humidity cycles with an ultrasonic humidifier; a virgin drawn egel fiber; and a fiber that had undergone quenching in an ice bath before drawing. Given all fibers have been drawn by hand, the fiber diameters vary and there are bifurcations, or bulges, that can be retained by the fiber. All of the fibers appear to be transparent, thus light can be transmitted through them.

Example 15

SEM Images of Drawn Silk Egel Fibers

Figure 22A:
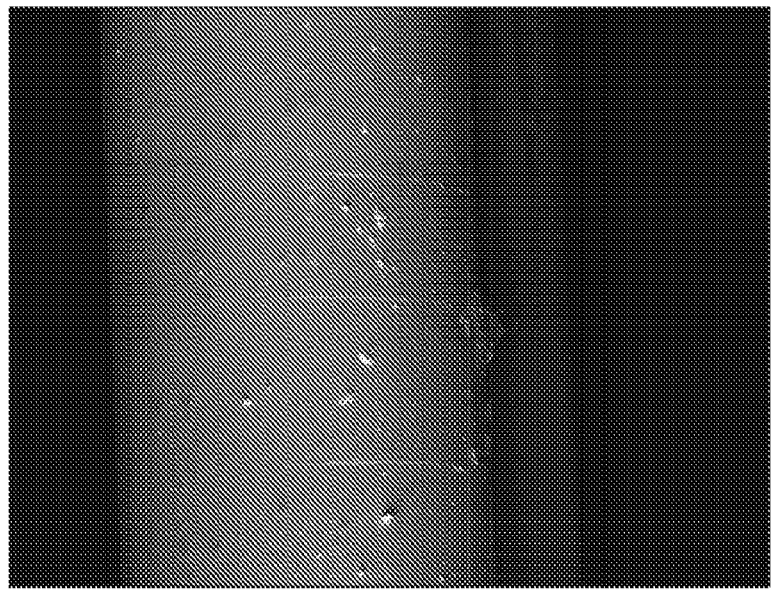
FIGS. 22A-22B shows scanning electron microscope (SEM) images of a drawn egel fiber: (22A) at 1560×; and (22B) 1960× magnification.
Figure 22B:
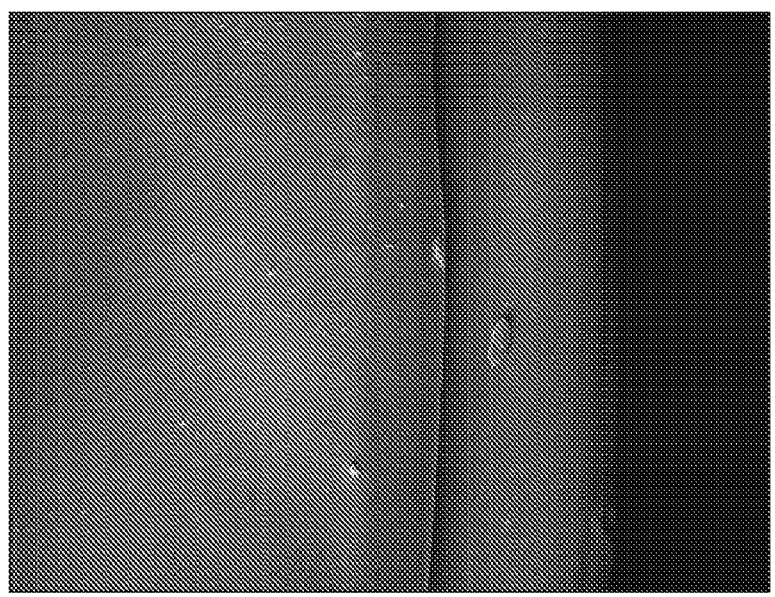

SEM images of several drawn egel fibers were taken, as shown in FIG. 22. Overall, the fibers had a fairly smooth surface, with two distinct features. As seen in both Figures, the fiber appears to be folded as if it were two fibers paired together. It is one fiber, but possibly drying rate or drawing instability may be causing this interesting folding feature. As shown in FIG. 22a, the fiber appeared to have some microcracks that suggest some damage was experienced, possibly when the fiber was bent with a small bend radius. Positive results from quenching indicates that fibers can be produced that are less brittle, which would possibly prevent the microcrack formation and lead to improved strength. This would also allow the fiber to be bent with smaller radii.

The invention claimed is:

1. A method of producing a silk fiber comprising: providing a silk fibroin gel comprising silk protein in a meta-stable silk I conformation; converting the silk fibroin gel to a viscous silk liquid;

drawing a silk fiber from the viscous silk liquid.

2. The method of claim 1, wherein converting the silk fibroin gel to the viscous silk liquid comprises quenching the silk fibroin gel in water.

3. The method of claim 2, wherein the water has a temperature at or below 0° C.

4. The method of claim 2, wherein the water has a temperature in the range from 40° C. to 80° C.

5. The method of claim 2, wherein drawing the silk fiber is performed at a temperature ranging from 10° C. to 40° C.

6. The method of claim 2, wherein converting the silk fibroin gel to the viscous silk liquid further comprises heating the silk fibroin gel prior to the quenching step.

7. The method of claim 6, wherein the silk fibroin gel is heated to a temperature higher than the temperature of water used in the quenching step.

8. The method of claim 1, further comprising drying the silk fiber.

9. The method of claim 1, further comprising contracting the silk fiber.

10. The method of claim 9, wherein said contracting the silk fiber comprises reducing the ambient humidity to which the silk fiber is exposed.

11. The method of claim 1, further comprising expanding the silk fiber.

12. The method of claim 11, wherein said expanding the silk fiber comprises increasing the ambient humidity to which the silk fiber is exposed.

13. The method of claim 12, wherein the silk fiber is exposed to steam.

14. The method of claim 1, wherein the silk fibroin gel comprising the silk protein in the meta-stable silk I conformation is produced by applying an electric field to a silk fibroin solution.

15. The method of claim 1, wherein said converting the silk fibroin gel to the viscous silk liquid comprises heating the silk fibroin gel.

16. The method of claim 15, wherein the silk fibroin gel is heated to a temperature of about 60° C. to about 75° C.

17. The method of claim 16, wherein the silk fibroin gel is heated in water.

18. The method of claim 2, wherein the viscous silk liquid is quenched in water having a temperature selected from the group consisting of: at or below 0° C., in the range of about 10° C. to about 40° C., and in the range of about 40° C. to about 80° C.

19. The method of claim 1, further comprising subjecting the silk fiber to a post-processing treatment for changing solubility of the silk fiber.

20. The method of claim 19, further comprising processing the silk fiber with an alcohol treatment or water annealing treatment to generate a water-insoluble silk fiber.

21. The method of claim 1, further comprising incorporating at least one silk fiber into a composite.

22. The method of claim 21, wherein the composite comprises combining at least one silk fiber with one or more silk fibers or other fibers, one or more polymers, or other forms of silk material.

23. The method of claim 22, wherein the composite is a textile-based component or structure, a sensor, an analog to a muscle fiber, a tissue material, a photomechanical actuation, a fiber optic cable, an electro-optic fiber and a smart material.

24. The method of claim 1, wherein the silk fiber is a silk optical fiber, a silk waveguide, a silk multi-mode fiber, or a silk single mode fiber.

25. The method of claim 1, wherein the silk fiber further comprises an active agent.

* * * * *